US011586656B2

(12) United States Patent
Gupta et al.

(10) Patent No.: US 11,586,656 B2
(45) Date of Patent: Feb. 21, 2023

(54) OPPORTUNITY NETWORK SYSTEM FOR PROVIDING CAREER INSIGHTS BY DETERMINING POTENTIAL NEXT POSITIONS AND A DEGREE OF MATCH TO A POTENTIAL NEXT POSITION

(71) Applicant: Zipstorm Inc, Bellevue, WA (US)

(72) Inventors: Anoop Gupta, Bellevue, WA (US); Aravind Bala, Redmond, WA (US)

(73) Assignee: Zipstorm, Inc., Bellevue, WA (US)

(*) Notice: Subject to any disclaimer, the term of this patent is extended or adjusted under 35 U.S.C. 154(b) by 433 days.

(21) Appl. No.: 15/961,745

(22) Filed: Apr. 24, 2018

(65) Prior Publication Data

US 2018/0307750 A1    Oct. 25, 2018

Related U.S. Application Data

(60) Provisional application No. 62/489,875, filed on Apr. 25, 2017.

(51) Int. Cl.
*G06F 16/335* (2019.01)
*G06F 16/907* (2019.01)
(Continued)

(52) U.S. Cl.
CPC ............ *G06F 16/337* (2019.01); *G06F 15/76* (2013.01); *G06F 16/248* (2019.01); *G06F 16/24578* (2019.01); *G06F 16/335* (2019.01); *G06F 16/3344* (2019.01); *G06F 16/907* (2019.01); *G06F 16/9535* (2019.01);
(Continued)

(58) Field of Classification Search
CPC .. G06F 16/435; G06F 16/9535; G06F 16/337; G06F 16/9035; G06F 16/90332; G06F 16/906; G06F 16/907; G06F 16/248; G06F 16/24578; G06F 16/3344
See application file for complete search history.

(56) References Cited

U.S. PATENT DOCUMENTS

2013/0317998 A1* 11/2013 Chen ................... G06Q 10/1053
705/321
2015/0127565 A1* 5/2015 Chevalier .............. G06Q 50/01
705/319
(Continued)

*Primary Examiner* — Tamara T Kyle
*Assistant Examiner* — Berhanu Mitiku
(74) *Attorney, Agent, or Firm* — Rahman LLC

(57) ABSTRACT

The present disclosure provides a method for identifying and representing potential next positions based on current position of user of an opportunity network system, the method including: (a) collecting and pre-analysing a comprehensive database of resumes or profiles of users, (b) extracting normalized entity information from resumes or profiles about backgrounds of users, (c) normalizing of the entity information of the users using at least one of machine learning techniques or statistical techniques to obtain normalized entity information, (d) identifying a comprehensive set of possible subsequent positions for the user based on the current position, (e) generating a position-detail profile for one or more of possible subsequent positions based on the profiles of people who are currently in that position or who may have previously worked at the position, and (f) determining a degree of match between resume or profile information of the user and at least one the position-detail profile of the target position.

20 Claims, 25 Drawing Sheets

(51) Int. Cl.
*G06F 16/2457* (2019.01)
*G06F 16/48* (2019.01)
*G06F 16/33* (2019.01)
*G06F 16/9535* (2019.01)
*G06Q 10/105* (2023.01)
*G06Q 10/107* (2023.01)
*G06F 15/76* (2006.01)
*G06F 40/295* (2020.01)
*G06F 16/248* (2019.01)
*G06N 20/00* (2019.01)

(52) U.S. Cl.
CPC ......... *G06F 40/295* (2020.01); *G06Q 10/105* (2013.01); *G06Q 10/107* (2013.01); *G06N 20/00* (2019.01)

(56) References Cited

U.S. PATENT DOCUMENTS

| | | | |
|---|---|---|---|
| 2016/0232160 A1* | 8/2016 | Buhrmann | G06F 40/14 |
| 2018/0158163 A1* | 6/2018 | Zhang | G06Q 50/2057 |
| 2018/0232751 A1* | 8/2018 | Terhark | G06N 7/005 |

* cited by examiner

FIG. 3B

| Inbox (5) | Career Insights | Featured Users | Blog | John Smith ∨ |

EXPLORE NEW POSSIBILITIES IN YOUR CAREER

- FULL VISIBILITY TO YOUR CAREER CHOICES
- UNIQUE INSIGHTS INTO ROLES THAT INTEREST YOU
- UNDERSTAND YOUR COMPATIBILITY WITH ANY JOB

[ LEARN MORE ]

☐ XXX  SOFTWARE ENGINEER  $117,000  ○ ○ ○

☐ YYY  SOFTWARE ENGINEER  $102,000  ○ ○ ○
YOUR COMPATIBILITY
SKILLS
PHP: 100%

☐ ZZZ  SOFTWARE ENGINEER  $126,000  ○ ○ ○

☐ XYZ  SOFTWARE ENGINEER  $141,000  ○ ○ ○

Other Ways to Explore...

Compare Companies

Compare people movement, job titles & pay between companies

Finnegan, Henderson, Farabow, Garrett & Dunner, LLP VS. USPTO

Make More Money

System has accurate salary data for millions of positions, Filter your Opportunities by salary to get paid what you're worth See possible next steps which pay more than your current job

Top Job Markets

The cities with the most jobs for people with your title (Patent Examiner) include Washington D.C. metro, Alexandria, Virginia and Baltimore Maryland See all cities for Patents Examiner

Background and Skills

Explore backgrounds, skills, salaries, and job histories of people in a specific position Your position (Patent Examiner  Imagineer @ The Walt
 @ USPTO)                               Disney Company Law Clerk @ Supreme Court of  Reporter @ the New
            the U.S.                     York Times See background for a different position Explore another path Curious about another career path? See the possible next steps for someone in any position
See the opportunities for a different position

FIG. 4B

| Inbox (5) | Career Insights | Featured Users | Blog | John Smith ∨ |

WHAT DOES IT TAKE TO LAND MY DREAM JOB?

EXPLORE THE BACKGROUNDS, SKILLS, SALARIES AND JOB HISTORIES OF PEOPLE IN A POSITION THAT YOU ASPIRE TO, AND SEE HOW YOUR BACKGROUND COMPARES TO THEM

MECHANICAL DESIGN ENGINEER AT TESLA MOTORS
DATA SCIENTIST AT GOOGLE
REPORTER AT THE NEW YORK TIMES
PARK RANGER AT NATIONAL PARK SERVICE

CHECK YOUR MATCH WITH ANY POSITION

ALL SYSTEM TOOLS

STUDENTS
NEXT STEP AFTER COMPLETING A DEGREE
COMPANIES THAT HIRE ALUMNI IN A LOCATION

PROFESSIONALS
WHERE PEOPLE GO NEXT AFTER LEAVING A SPECIFIC POSITION
COMPANIES THAT HIRE FOR A TITLE IN A SPECIFIC LOCATION
BACKGROUNDS, SKILLS & SALARY OF ANY POSITION

RECRUITERS
SYSTEM RECRUITER TOOL

FIG. 6B

< Dashboard

Career Map

The lands[...] nd title

USPTO ▶ [...]ate

Startin[...] possible next
steps, [...]tegories and /or
see a[...]ition in the word
cloud ○ Outside USPTO ○ Cardinal Intellectual Property

○ BANNER @ WITCOFF, LTD.

GOODWIN PROCTER LLP

Goodwin Procter LLP is the 35th wealthiest American law firm, consisting of more than 900 lawyers with offices in Boston, Frankfurt, Hong Kong, London, Los Angeles, New York City, Paris, Silicon Valley, san Francisco, and Washington, D.C. Goodwin focuses on complex transactional work and high stakes litigation in matters involving financial institutions, intellectual property, private equity, real estate capital markets, securities litigations/white collar defence, and technology/life sciences.

Associate
Salary for Associate at Goodwin Procter LLP: Min: $160K, Median: $185K, Max: $230K, More Information about Goodwin Procter LLP:
Goodwinlaw.com      google

Learn More

C GOVERNMENT

ELLIS LLP

OSKAUER ROSE LLP

Z ALLEN HAMILTON

EXAMINER@USPTO

Company Size

● ALL
○ 1-50 Employees
○ 50-500 Employees
○ 500-2000 Employees
○ 2000+ Employees Frequency
☐ More Common
☐ Less Common Industry
● ALL
○ Legal Services
○ Computer & Internet & IT Services
○ Education & Research
○ Military and Defense

PATENT ANALYST@LANDON IP

ASSOCIATE@WILSON SONSINI GOODRICH & ROSATI

INDEPENDENT CONSULTANT@SELF EMPLOYED

PARTNER@DORSEY & WHITNEY LLP    BUSINESS TECHNOLOGY

ANALYST@DELOITTE    ASSOCIATE@LOCKED LORD LLP

FIG. 7B

< Dashboard | Inbox (5) | Career Insights | Featured Users | Blog | John Smith >

Next Steps
Where people go next after leaving a specific company and title

AMAZON | Software Engineer | Update

Filters | Search in results

Companies ▽ | Company Size ▽ | Frequency ▽ | Industry ▽

| Company | Title | Salary | Size | Flow | Frequency | Industry | Saved |
|---|---|---|---|---|---|---|---|
| AMAZON | Senior Software Engineer | <Minigraph> | 10000+ | ↑ | *** | Retail | ☑ |
| AMAZON | Software Engineer Design | <Minigraph> | 10000+ | ↑ | ** | Retail | ☑ |
| AMAZON | Network Engineer | <Minigraph> | 10000+ | ↑ | ** | Retail | ☐ |
| GOOGLE | Software Testing Engineer | <Minigraph> | 10000+ | ↓ | * | Retail | ☐ |
| FACEBOOK | Senior Software Engineer | <Minigraph> | 10000+ | ↑ | * | Retail | ☑ |
| AMAZON | Senior Software Testing Engineer | <Minigraph> | 5000+ | ↓ | ** | Travel | ☑ |
| CONCUR | Software Testing Engineer | <Minigraph> | 5000+ | ↓ | * | Travel | ☑ |
| CONCUR | Senior Software Engineer | | | | | | |

FIG. 8A

| | Inbox (5) | Career Insights | Featured Users | Blog | John Smith > |
|---|---|---|---|---|---|

NEXT STEPS BY LOCATION
COMPANIES THAT HIRE FOR A TITLE IN A SPECIFIC LOCATION

| FINANCIAL ANALYST | | NEW YORK CITY | | |
|---|---|---|---|---|
| | | UPDATE | | |

FILTERS | SEARCH IN RESULTS | SALARY RANGE ∨ COMPANY SIZE ∨ NUMBER OF POSITIONS ∨ INDUSTRY ∨

WE HAVE FOUND 2052 COMPANIES | APPLIED FILTERS:

| ⇅ | COMPANY | TITLE | TITLE COUNTS | COMPANY SIZE | SALARY |
|---|---|---|---|---|---|
| 1 | IBM | FINANCIAL ANALYST | | | $76K |
| 2 | GOLDMAN SACHS | FINANCIAL ANALYST | | | $85K |
| 3 | NYU LANGONE MEDICAL CENTER | FINANCIAL ANALYST | | | $77K |
| 4 | THE BLACKSTONE GROUP | FINANCIAL ANALYST | | | $82K |
| 5 | WELLS FARGO | FINANCIAL ANALYST | | | $74k |

FIG. 9

Position Overview

Explore backgrounds, skills, and job history of people in a specific position

| Goodwin Procter LLP ▶ | Associate ✕ | Update |

Associate @ Goodwin Procter LLP

Company Info

Goodwin Procter LLP is the 35th wealthiest American law firm, consisting of more than 900 lawyers with offices in Boston, Frankfurt, Hong Kong, London, Los Angeles, New York City, Paris, Silicon Valley, san Francisco, and Washington, D.C. Goodwin focuses on complex transactional work and high stakes litigation in matters involving financial institutions, intellectual property, private equity, real estate capital markets, securities litigations/white collar defence, and technology/life sciences.

Salary for Associate at Goodwin Procter LLP:
Min: $160K, Median: $185K, Max: $230K, Your Compatibility Score

| 76% | Your background is a strong match with this position | Improve your chance of landing this position with these 3 steps |

People
Search for people in the position associate @ Goodwin Procter LLP
In your Professional network contacts
Across all of Networks

Job Listing
Jobs by Indeed

Career Path

Before...
 Summer Associate
 At Goodwin Procter LLP
 Associate
 At Latham & Watkins After...
 Partner
 At Goodwin Procter LLP
 Of Counsel
 At Goodwin Procter LLP

---

Education & Training

Skills    See all
 Litigations
 Legal Research
 Legal Writing
 Intellectual Property
 Private Equity Years of Experience    See all
 Longest : 14 Years
 Average : 4.1 Years Schools    See all
 Boston College Law School
 Boston University School of Law
 Georgetown University Law Center
 Fordham University School of Law
 Harvard Law School Majors    See all
 Law
 Political Science
 Chemistry
 Cum Laude
 History Certifications    See all
 Massachusetts Bar
 New York State Bar
 Registered Patent Attorney
 Licensed Attorney
 Certified Information Privacy

FIG. 10A

Position Overview

Explore backgrounds, skills, and job history of people in a specific position

| USPTO | ▶ | Primary Patent Examiner ✕ | | Update |

Primary Patent Examiner @ USPTO

Company Info
Average salary for primary patent examiner at USPTO: $125k
Learn More:

Your Compatibility Score

| 85% | Your background is a strong match with this position | Improve your chance of landing this position with these 3 steps |

People
Search for people in the position primary examiner @ USPTO
In your Professional network contacts
Across all of Networks Job Listing
Jobs by Indeed Career Path Before...
  Patent Examiner
    At USPTO
  Other
    At USPTO
  Assistant Patent Examiner
    At USPTO After...
  Supervisory Patent Examiner
    At USPTO
  Patent Attorney
    At USPTO
  Associate
    At Ropes & Gray LLP

---

Education & Training

Skills    See all
Patents
Patent Application
Patent Prosecution
Intellectual Property
Patent Searching Years of Experience    See all
Longest : 23 Years
Average : 7.7 Years Schools    See all
Penn State University
North Carolina State University
University of Maryland College Park
University of Illinois at Urbana-Champaign
George Mason University Majors    See all
Electrical Engineering
Mechanical Engineering
Law
Chemical Engineering
Computer Engineering Certifications    See all
Attorney

FIG. 10B

< Position Overview

Skills Map

| Amazon ▶ | | Software Engineer ✕ | Software Development Program ✕ | | Update |

Search [      ]

Frequency
☐ More Common
☐ Less Common
☐ Rare

Web services    Shell Scripting    Embedded system
       Mobile Applications    Test Automation         CSS        C++
Python
       Computer Vision    Spring Frame              Eclipse      SQL
Microsoft System    Amazon Web Services    Software development
                 Java                                    Machine Learning
Programming              Object Oriented Design
                        Android    Windows    Java Enterprise Edition
          LINUX    Java Script
Data structures  Core Java          Scalablity    Artificial Intelligence
                                Windows Azure
Microsoft SQL Server    Scalablity         Multithreading    Visual Studio
Data Mining                                    Java Enterprise Editing
       Android Development

FIG. 11

< Position Overview

Schools

| Google ▶ | Software Engineer ✕ | | Update |

Search ▢

Frequency
☐ More Common
☐ Less Common
☐ Rare

University of Florida — University of California, Santa Barbara
National Taiwan University — University of Waterloo
Harvey Mudd College — The University of Texas at Austin — Yale University
Stony Brook University
Harvard University — Penn State University — University of California, Los Angels
Columbia University in the city of New York — Columbia University
Massachusetts Institute of Techniology — University of Utah
Fudan University — Peking University
Shanghai jiao Tong University
University of Illinois at Urbana - Champaign — University of Maryland college Park — University of Michigan
Stanford University
Indian Institute of Technology, Bombay — University of Washington
National Taiwan University

FIG. 12

| | Inbox (5) | Career Insights | Featured Users | Blog | John Smith > |
|---|---|---|---|---|---|

< Dashboard

Alumni Next Steps
Where people go next after completing their education

| Carnegie Mellon University ▼ | | Computer Science ▼ | | Bachelors degree ▶ | UPDATE |
|---|---|---|---|---|---|

| Filters | Search in results | Salary range ∨ | Years After Graduation ∨ | Career Type ∨ | Company Size ∨ | Frequency ∨ | Industry ∨ |
|---|---|---|---|---|---|---|---|

Applied Filters: 0-2 years

We've found 865 possible next steps.

| ⇅ | Organization | Title/Program | Frequency | Company Size | Salary |
|---|---|---|---|---|---|
| 1 | Google | Software Engineer | | | $76K |
| 2 | Amazon | Software Engineer | | | $85K |
| 3 | Microsoft | Software Engineer | | | $77K |
| 4 | Facebook | Software Engineer | | | $82K |
| 5 | Carnegie Mellon University | Teaching Assistant | | | $74k |

FIG. 13

| Inbox (5) | Career Insights | Featured Users | Blog | John Smith > |

Alumni Next Steps by Location
Companies that hire alumni in a specific location

| Carnegie Mellon University ▶ | Computer Science ▶ | Bachelors degree ▶ | New York City | UPDATE |

| Search in results | Company Size ∨ | Industry ∨ |

Applied Filters:

We've found 96 Companies.

| ⇅ | Company | Alumni Count | Company Size |
|---|---------|--------------|--------------|
| 1 | Google | | |
| 2 | Yext | | |
| 3 | Bloomberg LP | | |
| 4 | Amazon | | |
| 5 | Facebook | | |

FIG. 14

OPPORTUNITY NETWORK SYSTEM FOR PROVIDING CAREER INSIGHTS BY DETERMINING POTENTIAL NEXT POSITIONS AND A DEGREE OF MATCH TO A POTENTIAL NEXT POSITION

BACKGROUND

Technical Field

The embodiments herein generally relate to big data analytics and machine learning applied to the field of identifying and suggesting career opportunities, and more particularly to an opportunity network system and method for providing career insights by determining potential next positions and a degree of match to a potential next position to users such as professionals and students.

Description of the Related Art

On our professional journey, where we decide to focus, and what opportunities and possibilities we decide to explore, are driven by what is visible to us. Tools that expand what is visible, that make the previously unseen seen are among those that have the most tremendous impact on humanity. Think of the microscope, the telescope, the x-ray and their impact. When it comes to our professional growth, what are easily visible are the opportunities being pursued by those in our immediate social and professional networks. In other words, the jobs, companies and organizations that our friends, family and colleagues have pursued.

This reliance on personal social and professional networks for career growth, which is the conventional wisdom approach, has worked well since ancient times, simply because these people are near and accessible to us and they know us and we know them. It is also well documented in research literature such as in Professor Mark Granovetter's work on weak ties. Further, all of us experience it every day as we pursue our own career journeys.

Even in the online world, the same conventional wisdom is applied and has been adopted by the dominant social and professional networking websites based on our friends or connections. As example, professional networks like LinkedIn® and Twitter® are fundamentally based on connections. The more the number of connections a user has within the network, the more the number of people the user can see, message, and approach, to realize opportunities.

Hence, these networks encourage users to add more and more connections in order to able to send free messages to the connections, conduct more effective searches (e.g. since search results are restricted to second level connections on LinkedIn®), see more profiles of connections of connections, and receive news and updates related to connections. Professional networks like Twitter® also encourage you to build large number of followers (and/or follow many people) so as to stay aware of events and be able to direct-message other influential people. While the conventional-wisdom approaches remain useful even in today's world, following the conventional-path only or primarily through our professional networks is a limited and limiting approach.

Many life-changing opportunities arise only when we move beyond the familiar, reaching out beyond our immediate network of co-workers and friends. As an example, even for an extrovert software engineer at Microsoft® who has hundreds of friends and colleagues, it is infeasible to track the opportunities being pursued by tens of thousands of software engineers at Microsoft® and leverage that information for career enhancement. Not only that, the software engineer at Microsoft® may have little idea of the aggregated opportunities and career paths being pursued by software engineers at Facebook®, Google®, Amazon®, Uber®, Tesla®, IBM®, Intel®, and numerous other companies. What is visible to us through our own professional networks is only a small fraction of the complete set of relevant opportunities (e.g. just the tip of the iceberg), and the vast bulk of opportunities remain invisible to us just as vast bulk of the iceberg remains invisible underneath the ocean surface.

In the currently available solutions, not only is it difficult to determine the various opportunities that available to us, it is also hard to determine more information (e.g. skills, colleges, degrees, majors, past companies, past positions, salaries etc.) about such opportunities and roles. One could spend hours searching web sites to piece together such information, and still only get a rough semblance of the picture for a single position. With such overheads, most of us are unlikely to look too widely, thus missing out on potentially life-changing opportunities. Hence opportunities that are unseen are lost. Further there is no way for users to also identify which opportunities they are likely to be a good fit for, to what extent, or whom to contact for pursuing the opportunity.

Accordingly, there remains a need for an opportunity networking system that provides career insights by determining potential next positions and a degree of match to a potential next position to users such as professionals and students.

SUMMARY

In view of the foregoing, an embodiment herein provides a one or more non-transitory computer readable storage mediums storing one or more sequences of instructions, which when executed by one or more processors provide career-insights to users by determining potential next positions and a degree of match to any potential next position based on a current position and background of a user of an opportunity network system. The one or more non-transitory computer readable storage mediums storing one or more sequences of instructions, which when executed by one or more processors causes collecting and pre-analysing a comprehensive database of resumes or profiles of users, extracting normalized entity information from resumes or profiles about backgrounds of users, including current and past positions held by users, normalizing of the entity information of the users using at least one of machine learning techniques, statistical techniques, web-search techniques, or natural language processing techniques to obtain normalized entity information in resumes or profiles of the users, identifying a comprehensive set of possible subsequent positions for the user based on the current position and the comprehensive set of possible subsequent positions for the user is identified based on subsequent positions held by other users who previously held a position equivalent to the current position of the user, processing a selection of at least one of the possible subsequent positions for obtaining a target position, generating a position-detail profile for one or more of possible subsequent positions based on the profiles of people who are currently in that position or who may have previously worked at the position, wherein the position-detail profile comprises any of previous positions, subsequent positions, skills, years of experience in current and past positions, certifications, educational experience of the people who are currently in that position and who may have previously worked at the position, determining a degree of match between resume or profile information of the user and at least one the position-detail profile of the target position and enabling the user to communicate with one or more people associated the target position to further explore career opportunities.

In one aspect, an opportunity network system that provides career insights to a user by determining potential next positions and a degree of match to a potential next position includes a processor and a non-transitory computer readable storage medium comprising one or more modules executable by the processor. The one or more modules includes a web information extracting module, an intelligent profile parse module, an opportunity generation module, a position detail profile generation module, a position compatibility module, and a message generation module. The web information extracting module collects and pre-analyses a comprehensive database of resumes or profiles of users. The intelligent profile parse module extracts normalized entity information from resumes or profiles about backgrounds of users, including current and past positions held by users, and skills of users, educational experience of users of the opportunity network system. The positions are a function of at least a company and a title associated with the users. The intelligent profile parse module also normalizes the entity information of the users using at least one of machine learning techniques, statistical techniques, web-search techniques, or natural language processing techniques to obtain normalized entity information in resumes or profiles of the users. The opportunity generation module identifies a comprehensive set of possible subsequent positions for the user based on the current position and the comprehensive set of possible subsequent positions for the user is identified based on subsequent positions held by other users who previously held a position equivalent to the current position of the user.

The position detail profile generation module generates a position-detail profile for one or more of the possible subsequent positions based on the profiles of people who are currently in that position or who may have previously worked at the position. The position-detail profile comprises any of previous positions, subsequent positions, skills, and years of experience in current and past positions, certifications, educational experience of the people who are currently in that position or who may have previously worked at the position. The position compatibility module that determines compatibility between resume or profile information of the user and at least one the position-detail profile using machine learning or a statistical technique and determines a degree of match between resume or profile information of the user and at least one the position-detail profile of a target position. The message generation module that enables the user to communicate with one or more people associated with such the target position to further explore career opportunities.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A and 3B illustrate user interface views of the opportunity network system of FIG. 1 according to an embodiment herein;

FIG. 4B illustrates a user interface view of a personalized dashboard that provides one or more options to a user to explore career opportunities according to an embodiment herein;

FIGS. 6A and 6B illustrate user interface views obtaining on selecting a career insights tab as shown in FIGS. 3A and 3B according to an embodiment herein;

FIG. 7B illustrates a user interface view of an opportunity map that provides brief information on position details according to an embodiment herein;

FIGS. 8A and 8B illustrate user interface views of a grid view of an opportunity map that provides one or more subsequent possible positions to transition to from a specific position according to an embodiment herein;

FIG. 9 illustrates a user interface view of an opportunity map specific to a location where companies hire for a specific title according to an embodiment herein;

FIGS. 10A and 10B illustrate user interface views of opportunity maps that provides position details for specific positions to users according to an embodiment herein;

FIG. 11 illustrates a user interface view of a map of skills possessed by a plurality of users who are currently holding a selected position according to an embodiment herein;

FIG. 12 illustrates a user interface view of map of schools that illustrates a plurality of schools attended by a plurality of users who are currently working in the selected position according to an embodiment herein;

FIG. 13 illustrates a user interface view of an opportunity map for students according to an embodiment herein;

FIG. 14 illustrates a user interface view of an opportunity map specific to companies that hire alumni in a specific location according to an embodiment herein;

DETAILED DESCRIPTION OF PREFERRED EMBODIMENTS

Figure 1:
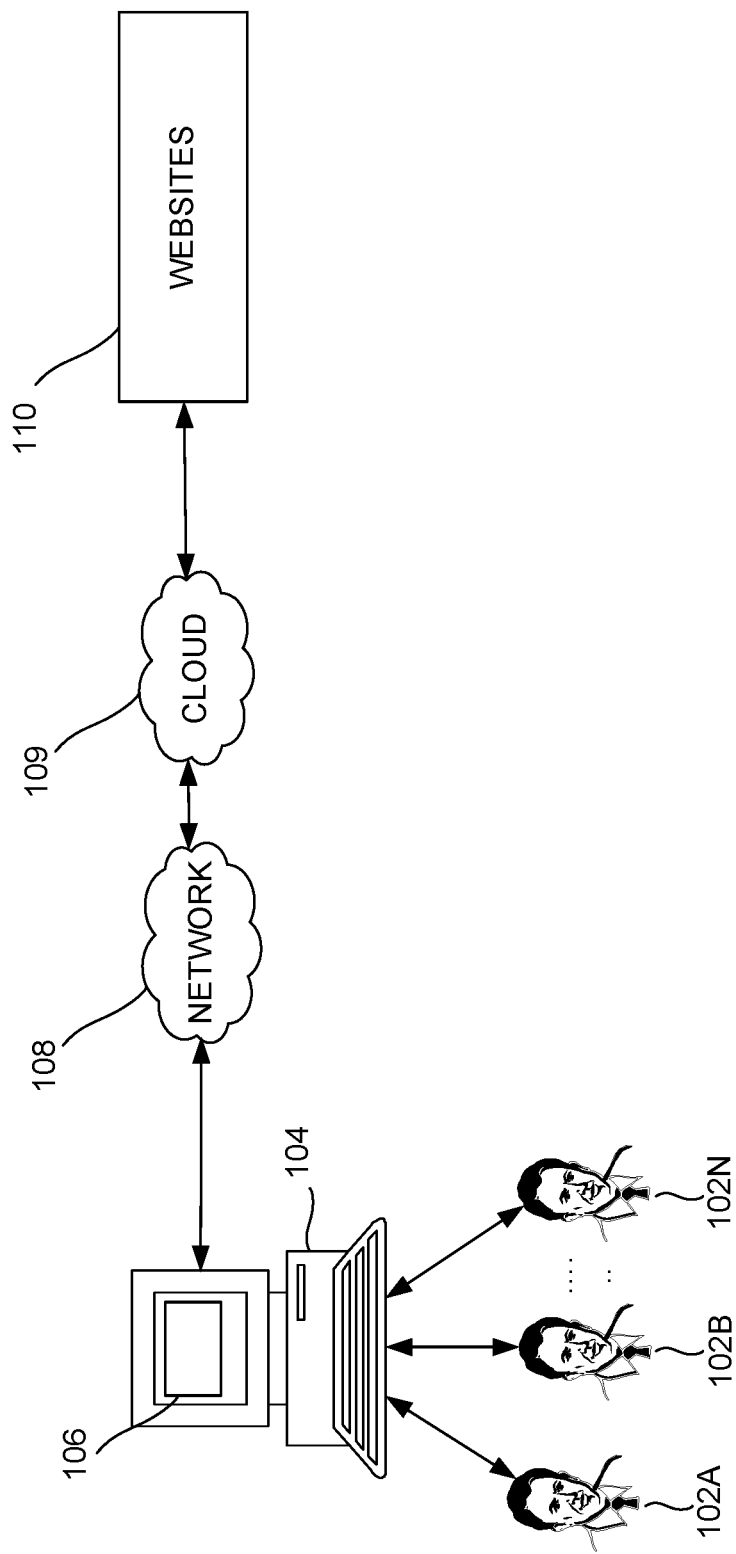
FIG. 1 illustrates an opportunity network system that obtains entity information from a plurality of users and websites to generate an opportunity map for a user according to an embodiment herein.

The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Descriptions of well-known components and processing techniques are omitted so as to not unnecessarily obscure the embodiments herein.

The present disclosure provides one or more non-transitory computer readable storage mediums storing one or more sequences of instructions, which when executed by one or more processors provide career-insights to a user of an opportunity network system by determining potential next positions and a degree of match to a potential next position, by performing the steps of:

collecting and pre-analysing a comprehensive database of resumes or profiles of users;

extracting normalized entity information from resumes or profiles about backgrounds of users, including current and past positions held by users;

normalizing of the entity information of the users using at least one of machine learning techniques, statistical techniques, web-search techniques, or natural language processing techniques to obtain normalized entity information in resumes or profiles of the users;

identifying a comprehensive set of possible subsequent positions for the user based on the current position, wherein the comprehensive set of possible subsequent positions for the user is identified based on subsequent positions held by other users who previously held a position equivalent to the current position of the user;

processing a selection of at least one of the possible subsequent positions to obtain a target position;

generating a position-detail profile for one or more of the possible subsequent positions based on the profiles of people who are currently in that position or who may have previously worked at the position, wherein the position-detail profile comprises any of previous positions, subsequent positions, skills, years of experience in current and past positions, certifications, or educational experience of the people who are currently in that position and who may have previously worked at the position;

determining a degree of match between resume or profiles information of the user and at least one the position-detail profile of the target position; and enabling the user to communicate with one or more people associated the target position to further explore career opportunities.

In one embodiment, the one or more non-transitory computer readable storage mediums storing one or more sequences of instructions, which when executed by one or more processors further includes the steps of: (i) processing a first input from the user on a subset of the metadata that is of interest; and (ii) filtering the plurality of possible subsequent positions to obtain a subset of possible subsequent positions corresponding to the possible subsequent positions that match with the subset of the metadata that is of interest. In an embodiment, the subset of the metadata is at least one of a company metadata, a position metadata, and a frequency of transfers from at least one the subsequent position to a next position In another embodiment, the one or more non-transitory computer readable storage mediums storing one or more sequences of instructions, which when executed by one or more processors further includes the steps of: (i) processing a second input from the user includes an interaction with at least one node from the subset of possible subsequent positions; and (ii) generating and displaying a brief position profile of a position associated with the node in response to the interaction with the node. In yet another embodiment, the brief position profile includes company information, title information, and salary information associated with the position.

In yet another embodiment, the one or more non-transitory computer readable storage mediums storing one or more sequences of instructions, which when executed by one or more processors further includes the steps of processing a selection of at least one selected possible subsequent position by the user from the subset of possible subsequent positions to save the selected possible subsequent position in the opportunity network system for subsequent analysis. In yet another embodiment, the method further includes the steps of: (i) processing at least one additional position; and (ii) identifying a comprehensive set of possible subsequent positions for the at least one additional position. In yet another embodiment, the comprehensive set of possible subsequent positions for the at least one additional position is identified based on subsequent positions held by other users who previously held a position equivalent to the at least one additional position. In yet another embodiment, the plurality of possible subsequent positions that represent the comprehensive set of possible subsequent positions for the user is generated based on a combination of the comprehensive set of possible subsequent positions for the user based on the current position and the comprehensive set of possible subsequent positions for the at least one additional position. In one embodiment, the additional position may be equivalent to the current position.

In yet another embodiment, the one or more non-transitory computer readable storage mediums storing one or more sequences of instructions, which when executed by one or more processors further includes the steps: (i) processing background information for the user; and (ii) identifying a comprehensive set of possible subsequent positions based on the background information by identifying subsequent positions held by other users having at least one of the same or equivalent education information, having held the same position as the at least one past position, the same skills information, or the same certification information. In yet another embodiment, the background information is at least one of education information, at least one past position, skills information, or certification information. In yet another embodiment, the plurality of possible subsequent positions that represent the comprehensive set of possible subsequent positions for the user is generated based on a combination of the comprehensive set of possible subsequent positions for the user based on the current position and the comprehensive set of possible subsequent positions based on the background information.

In yet another embodiment, identifying the comprehensive set of possible subsequent positions includes: extracting a comprehensive set of information of the other users who are currently working in the subsequent positions or who held the subsequent positions in the past from (a) one or more resumes or profiles of the other users available in websites, (b) information that is entered by the other users in the opportunity network system, (c) information directly imported by the other users into the opportunity network system, or (d) information related to the other users obtained from one or more websites.

In yet another embodiment, the metadata associated with each of the plurality of possible subsequent positions corresponding to possible subsequent positions for the user includes user generated content that is entered by other users of the opportunity network system that includes at least one of (a) work-life balance information, (b) interview questions, (c) a gender ratio or (d) what it takes to succeed in the possible subsequent positions. In yet another embodiment, the metadata associated with each of the plurality of possible subsequent positions include at least one of (a) transition specific metadata selected from a frequency of transfers from at least one the subsequent position to a next position, (b) current opening metadata includes current openings for the position, (c) position metadata includes company size, an industry that the company belongs to, or salary information associated with the position, (d) people metadata selected from users who hire for the subsequent positions, users who held the subsequent positions in the past, users who interviewed in the past for the subsequent positions, and users from the same companies corresponding to the subsequent positions or (e) matching metadata that includes a degree of match between at least one subsequent position and the entity information of the user.

In yet another embodiment, the one or more non-transitory computer readable storage mediums storing one or more sequences of instructions, which when executed by one or more processors further includes the steps: (i) processing a selection of at least one selected node from the subset of possible subsequent positions; and (ii) generating a position detail profile in response to the selected node which includes at least one of (a) the transition specific metadata, (b) the current opening metadata, (c) the position metadata, (d) the people metadata, or (e) the matching metadata.

In yet another embodiment, the position metadata further includes at least one of educational details, professional details, skills and certifications, years of experience prior to getting to the subsequent positions since graduation, years of experience in the subsequent positions, a position held prior to the subsequent positions or a position transitioned to after the subsequent positions of the other users. In yet another embodiment, the opportunity network system includes a messaging system that allows users to specify messaging preferences selected from who they are open to receiving messages from, on what topics, and a volume of messages over any given period of time.

In yet another embodiment, the one or more non-transitory computer readable storage mediums storing one or more sequences of instructions, which when executed by one or more processors further includes the steps: (i) processing a selection of a target position from the plurality of possible subsequent positions; (ii) obtaining the people metadata corresponding to the target position; (iii) extracting messaging preferences specified by the users from the people metadata corresponding to the target position; (iv) matching the user preferences with the messaging preferences; and (v) automatically generating a communication interface for the user to communicate with the users from the people metadata corresponding to the target position.

In yet another embodiment, the entity information of the users includes at least one of (a) companies or industries where the users are currently working or had worked in the past, (b) titles of past positions of the users, (c) skills and certifications of the users, (d) schools attended by the users, (e) majors and degrees studied by the users, or (f) locations of the users. In yet another embodiment, the entity information of the users is extracted from at least one of (a) one or more resumes or profiles of the users available in websites, (b) information that is entered by the users in the opportunity network system, (c) information directly imported by the users into the opportunity network system, or (d) information related to the users obtained from one or more websites.

In yet another embodiment, the one or more non-transitory computer readable storage mediums storing one or more sequences of instructions, which when executed by one or more processors further includes the steps: (i) analyzing metadata for a given category or sub-category for each of the possible subsequent positions for the user; and (ii) dynamically generating filters for at least one of the category or the sub-category based on a frequency of occurrence of the category or sub-category of the metadata.

The present disclosure also provides a system for providing a comprehensive landscape of relevant opportunities to users (e.g. professionals and/or students) and further guiding them (e.g. users) towards suitable actionable steps. The embodiments herein disclose an opportunity network system for professionals providing visibility to the comprehensive landscape of relevant opportunities for a given user based on their current company, title, or their educational background or their title and their current location. In one embodiment, the current position is defined as a tuple that includes a name of a current company and a current title within the company.

The opportunity network system may compute a personalized-opportunity-map leveraging big-data, statistical, machine-learning, and natural language technologies y representing the comprehensive landscape of relevant opportunities for users (e.g. professionals or students). In one embodiment, the opportunity map includes a plurality of possible subsequent positions. Each possible subsequent position of the opportunity map represents a distinct position (e.g. tuple consisting of company and title) of the user within the same company (e.g. a current company) or at different companies or institutions. The career-map may be derived from statistically analyzing job switches that real people have made between the two positions based on information listed in their resume, professional profile etc. (e.g. all-up analysis done by analyzing tens of millions of resumes or profiles and hundreds of millions of job-transitions people made, across the world). As an example, we may find that Patent Examiners at USPTO frequently make transition to Primary Patent Examiner within USPTO and to Patent Analyst at Landon IP outside of the USPTO.

The opportunity network system may associate a plurality of users' resumes or profiles (e.g. that are suitably anonymized) with a possible subsequent position. The plurality of users may be (a) users who are currently associated with the role, and (b) users who were previously associated with the role. Such users' resumes or profiles and job transitions are used in the computation of the opportunity map after a variety of deep analysis. The plurality of users may also be (a) recruiters (e.g. users who are currently hiring a suitable person for the role), and (d) users who are open to being a mentor for the role or open to answering questions about the role, etc. This latter data is not stored anonymized and is used to help establish communications between a user interested in obtaining the role and those that can help answer questions.

The transitions between possible subsequent positions may include a variety of metadata, which may be computed data or user generated data. The computed-data may be derived from the anonymized analysis of user resumes or profiles. An example of such computed-data would be the number of times a particular job-transition was made by real users over a certain interval of time (e.g. the number of transitions observed in the last year between software-engineer at Microsoft® to software-engineer at Amazon®, and vice versa). Examples of user-generated content/data for transitions would be the engineers directly adding commentary on the opportunity network system regarding the interview questions asked when the user moved from Microsoft® to Amazon®, or their transition experience, male-female gender ratio, or the new technology stack they had to learn, etc. This data can be surfaced for users exploring the opportunity map to decide whether they are interested (or not) in pursuing a specific opportunity or not. In one embodiment, users searching the opportunity map will get access to details about the positions as user-generated content. The users can add information to the user-generated content, up-vote or down-vote such information.

There is also non-transition specific metadata associated with each possible subsequent position. Examples of such data include a) description of the company, b) size of the target company, c) industry that the company belongs to, d) salaries associated with such positions in the company, e) presence or absence of job openings for such a target position (e.g. subsequent position), f) links to job openings, is they exist, g) past positions from which people are hired into this role, h) positions that people transition to after serving in this position, h) skills associated with this position, i) educational background (e.g. colleges, majors, degrees, certifications) of people currently in this position, j) goodness of match of target position (e.g. subsequent position) with the user's resume or profile, k) other websites and links that provide additional commentary about the position (e.g. on Quora), and etc. Such data may come from curating relevant information from various web sites, or directly obtained from the users. The opportunity network system may extract the above information from a data analysis of a plurality of resumes or profiles available in a public network (e.g. from websites such as job portals or professional networking websites) or from information that the users have directly imported or entered into the opportunity network system. This information is called Position Details.

In one embodiment, a user experience (UX) of the opportunity network system may include a collection of filters for the opportunity map, which may be dynamically generated. For example, the filters are dynamically generated as follows: (i) for next positions opportunity map, the opportunity network system first generates all feasible next positions (e.g. possible subsequent positions) based on transitions that real people have made previously. Once the next positions (e.g. possible subsequent positions) are generated, the opportunity network system may determine the industry that the resulting companies belongs to. The filters are generated only for those companies. For example, if there was no companies belong to healthcare industry, the opportunity network system does not generate the filters that allow the user to select healthcare as an industry.

The collection of filters may allow the user to filter the possible subsequent positions in the opportunity map to highlight different kinds of relevant opportunities based on the associated meta-data (e.g. filter by companies in a certain industry, only show roles which have a higher median salary than the current salary, or startup companies that have fewer than 50 employees, and so on).

The opportunity network system may also include an easy interaction mechanism (e.g. by hovering over or clicking on a node in the opportunity map) to obtain summary information on each position in the opportunity map. The interaction mechanism may also enable saving desirable positions in the opportunity map for subsequent detailed perusal. Alternatively, the interaction mechanism may allow a user to click on any node in the opportunity-map and see the full Position-Detail Page which has more comprehensive information about that position. Broadly, the opportunity network system may allow the users to be exposed to and to make intelligent choices about opportunities to pursue based on a comprehensive map of relevant opportunities and associated rich metadata.

The opportunity network system may dynamically generate the opportunity map. In one embodiment, the opportunity map is generated not only based on one starting position of the user in the company, but also based on a collection of such positions (e.g. a starting point may be several almost equivalent positions within a company, such as software engineer at Microsoft®, software development engineer at Microsoft®, Software Design Engineer at Microsoft®, Software Development Engineer at Microsoft® etc.). If the multiple equivalent positions (e.g. software engineer at Microsoft®, software development engineer at Microsoft®, Software Design Engineer at Microsoft®, Software Development Engineer at Microsoft® etc.) are identified for the user, the opportunity network system may treat the multiple equivalent positions as the same by combining all the data related to each equivalent position.

In another embodiment, the opportunity network system generates the opportunity map based on more comprehensive background information of the user (e.g. education of the user, past positions in the company, skills and certifications of the user etc.) versus just a single position. In an embodiment, the opportunity map provides a comprehensive set of next opportunities/possibilities (e.g. possible subsequent positions) based on this rich background information of the user. The opportunity network system may generate the opportunity map based on one or more of education background of the user, past positions of the user, skills and certifications of the user. For example, if the user mentioned their positions in the resume or profile as: (a) Position A (2014-Present), (b) Position B (2012-2014) and (c) educational details (e.g. School A, Degree A, Major A) (2008-2012). The opportunity network system may identify a next position for the user from the position B based on a position detailed profile of the position B. The opportunity network system may identify the possible subsequent positions for the user from the position A and the position B based on educational details (e.g. School A, Degree A, Major A).

The opportunity map may also be combined with a people graph to help users learn more about or to obtain a position. In an embodiment, the metadata associated with each node/position in the opportunity map includes pointers (i.e. non-anonymized and massageable) who can help others to realize that opportunity in the short or long-term future. The people may be recruiters or hiring-managers who hire for that specific position and who can answer questions for candidates. In yet another embodiment, the people associated with a node may be employees who previously worked in that position in the past and are open to answering questions about that position. In yet another embodiment, the people may be users who have interviewed previously in the past for that position. In yet another embodiment, the people may be users who are open to being mentors for others who seek that role as a future opportunity.

In one embodiment, the users associated with the possible subsequent positions are part of a messaging system that allows the user to specify the messaging preferences. The messaging preferences may include (i) from whom the users are open to receiving messages, (ii) on what topics the users are interested to receive messages and (iii) the volume of the messages over any given period. In one embodiment, the user (e.g. a professional user) may specify his/her preferences as follows: "I am open to answering 10 questions per month from students who went to the same university as I did, about my current position". The opportunity network system may automatically and dynamically surface such professionals for a student who wants to know more about a position provided if the student's profile matches the professional's preferences.

An Opportunity Network System for Students: The embodiments herein also disclose an opportunity network system for students providing visibility to the comprehensive landscape of relevant opportunities based on alumni who previously graduated from the same school, with the same major/degree as the student. In an embodiment, an educational background is the triple consisting of a current-school/college, a current-major at a university and an expected-degree of the user. The opportunity network system may generate an opportunity map that leverages big data, machine learning, statistical techniques, and natural language technologies to understand the landscape of relevant opportunities for students by looking at resumes or profiles of people who previously done the same educational program. The opportunity map may also be computed if only school-major or school-degree are specified by the user. In one embodiment, the opportunity map includes a plurality of possible subsequent positions. Each node of the opportunity map represents a distinct position at companies or educational institutions that users with the same educational background transitioned to. In all regards, other that the starting point of college-major-degree versus company-position, the student's opportunity network systems works the same as the professional opportunity network system.

A Compatibility Score and Report: One embodiment herein discloses an opportunity network system for professionals and students that provide a compatibility score and/or a compatibility report as a basis for informing the user about degree/extent of match between their background/resume or profile and any position detail profile in the opportunity map. The users may provide information about the background details manually, or by importing the resume as a PDF file or importing by connecting to a profile on a job or professional networking websites etc. The opportunity network system may parse the user's resume or profile to understand his/her top skills, experience (e.g. years of experience, previous companies etc.) and educational background. The opportunity network system also provides a top skills of the user that matches with the position detail profile and a top skills that missing from a profile of the users According to one embodiment, the compatibility report leverages machine learning and statistical techniques to compute a degree of match between a user-entered profile and a position-detail profile. For example, the compatibility report may inform the user that his/her profile satisfies 4 skills out of the top 10 skills mentioned for a position at USPTO and notify the user about the remaining 6 skills that are missing. In an embodiment, the compatibility report may also provide recommendations to the user to acquire or learn the missing skills and/or suggest to the user to add some of these skills if they have that skills but are missing from their resume or profile.

Similarly, a matching algorithm may provide, based on an educational background (e.g. school, major, degree) of the user, the top schools from which the company hires for the position, whether the company has previously hired people with the same educational background as the user or if there is no any previous data about the company hiring people with the user's educational background.

The compatibility score may be a single number or a percentage summary (e.g. 69% match) or text/word representing the qualitative degree of match (e.g. great, good, neutral, stretch, poor) for the position based on the overall compatibility report details. In addition, the compatibility score could include explanations on the various parts that contributed to the score, such as skills, schools, previous positions, years of experience etc.

The compatibility score and report may be further refined for greater value if the user provides a specific job-description for a given open position that they wished to apply for. In that case, the opportunity network system (a) first parses the job-description (JD) and extracts the meaningful entities and keywords from the job description (b) merges the appropriate weights with the position requirements obtained from the position-detail metadata, and (c) does an intelligent match with such merged requirements.

The opportunity network system may provide a filter to the users to dynamically filter the possible subsequent positions shown in the opportunity map based on a degree of match. The compatibility score (CS) and the compatibility report (CR) may not be limited to perform matching simply on the basis of an exact match (e.g. a user went to Stanford University and the person detail profile says that research scientists at Microsoft® often come from Stanford). For example, the opportunity network system may derive that Stanford is a top-tier research university and so is Massachusetts Institute of Technology (MIT) and both may be considered equivalent for matching purposes. Similarly, the opportunity network system may include many intelligent algorithms to identify the equivalence between skills, certifications, companies etc. so that an "intelligent-matching" is used wherever feasible rather than relying on "exact matching". The opportunity network system may use various techniques including natural language parsing techniques, domain dictionaries like Wikipedia and web search to determine equivalences of different entities. Some of the information could also be human authored, such as a list of top tier universities.

In an embodiment, the compatibility score measures the match between a user's resume or profile and the possible subsequent position. The compatibility score is calculated for different sections (e.g. skills, certifications, positions, education, location, years of experience, and salary), and are combined for an overall score. For each section, the opportunity network system may look at (a) matches between the user and the top feature for all the users who are currently in that particular position (e.g. a skill that the user has can be one of the top skills for that position, (b) top missing features (e.g. skills, certifications, etc.) from the users resume but the user who are currently in that position have that features, and (c) there are common between the users resume or profile and the target profile, but that are not very important to the target position. In one embodiment, identification of top missing skills can be used to improve the resume or profile.

The positions from where users transition to a position are identified. If the user has the same background as one of the most common backgrounds for a position, it is a big advantage while calculating the compatibility score. While calculating the compatibility score, the opportunity network system may (a) check whether the educational background of the user matches with the people who are currently working in that position, (b) compare years of experience of the user with the people who are currently in that position and (c) compare the salary of the user with the people who are currently in that position.

The opportunity network system may detect whether a particular section is relevant to the user. For example, even though there are lots of certifications, if most people who are currently in that particular role do not have any certifications, the opportunity network system might flag that section as not relevant. The opportunity network system may compute the compatibility score based on matches in each section, and combine that to a final compatibility score. The weights may be calculated based on various techniques including rule based and based on fitting with real resumes or profiles (e.g. for people who are currently in the role, the score should be very high, and for people who are not a good match the score should be low).

The opportunity network system may automatically draft an email or a message and send the email to the candidate, which states that (i) there is a good match for your profile with a particular open position, (ii) why there is a good match for your profile and (iii) why the recruiter should consider your profile for applying for the open position. The opportunity network system may allow the recruiter to modify or update the email before sending the email to the candidate.

Brief description of modules in the Opportunity Network System: (See FIG. 2) According to an embodiment, the opportunity network system includes a entity information database, an entity prioritization module, an intelligent profile parser module, a web information extracting module, an opportunity map generation module, a metadata synthesis module, a position detail profile generation module, a position compatibility module, a dashboard personalization module, a user interaction module and a message generation module.

The comprehensive database stores information about various entities found in public resumes or profiles. An Entity information is extracted from the comprehensive database. The Entity information may include companies, titles, skills, certifications, schools, majors, degrees, locations and industries. Metadata about the entity information is compiled, computed and/or synthesized by the opportunity network system based on resumes or profiles analyzed from the web, from the users explicitly providing information to the opportunity network system, or from numerous web resources (e.g. the H1B visa database published by the US Govt. consisting of salaries of those seeking H1B status in US, Wikipedia, Web search etc.).

In one embodiment, information associated with the users includes profiles (e.g. professional history), messaging preferences of the users, communication addresses of the users etc. The information of the companies may include a name, a description, an industry, a number of employees etc. The skills may include a description of skills that the user has, equivalent skills that user has, websites that includes more details about skills, where the user learnt the skill etc. Position related information may include tuples of the company or title that are present in the user's resumes or profiles, what is common or uncommon at various companies and industries, a salary associated with the position at a given company, skills required for the position etc.

The entity prioritization module prioritizes one or more entities obtained by the opportunity network system. For example, for a popular position the opportunity network system (e.g. software engineer at Amazon®), the opportunity network system may include thousands of skills associated with the position. The entity prioritization module prioritizes the entities (e.g. skills) based on which are most likely to be responsible for success and/or economic benefits for the position.

The intelligent profile parser module populates an entity database and metadata by performing tokenization, spelling correction, acronym expansion and/or equivalence detection on entity details obtained from the plurality of resumes or profiles and the websites. The intelligent profile parser module normalizes or standardizes the entity using machine intelligence, natural language analysis, and/or statistical techniques to normalize or standardize entities (e.g. reduce the entity to a manageable or understandable form from the hundreds of different ways that people write the same or equivalent information in their resumes or profiles). The entities may include a title, company name, university name, major name, position name etc.). The intelligent profile parser module normalizes or standardizes the entity by (a) removing the filter words (e.g. look for the prominent words based on frequencies), (b) expanding abbreviations, (c) manual authoring (e.g. the opportunity network system may built a tool for authors to do the merge and review previous merges), and (d) redirecting to a Wikipedia to find equivalent phrases. The entities are normalized by standardizing web search. If two string match to the same URL in web search, they are likely the same. For example, if the user type "ohio state univ" and "osu" in Google®, the user will select osu.edu as the top URL. This gives the signal that these two strings are likely the same. In an embodiment, machine intelligence, natural language analysis, and/or statistical techniques are used to normalize a number of variations in the resumes or profiles because of: word order, spelling, subsidiaries, abbreviations, acquisitions, geographies etc. To map the variations correctly, the opportunity network system may use a combination of the following techniques: (a) keeps the word in a lower case, (b) stemming the words to reduce inflected (or sometimes derived) words to their word stem, base or root form-generally a written word form, (c) refer a Wikipedia to identify alternate ways of saying/mentioning the same thing—abbreviations etc., (d) doing a web search to map the same URL for two queries (e.g. "IIT Bombay" vs "Indian institute of technology, Bombay" both map to the same URL) and (e) performing a spell check. In one embodiment, the opportunity network system keeps the word in upper case. To make sure the normalization of the entity information of the user, the machine learning techniques are used to combine the above mentioned different techniques together to decide if entity A should map to entity B.

The normalization of the entity information of the user is typically done by creating a training set which is manually checked by a professional trainer/a programmer where we say A and B are equivalent. The training set is used to train a classifier to predict whether we should combine two entities.

The web information extracting module obtains a plurality of entities that emerge from the analysis of the plurality of resumes or profiles from the intelligent profile parser module and gathers additional information from websites and web databases about each of the entities. The web information extracting module is further responsible for merging the entities which initially appeared as distinct during parsing (e.g. titles of software engineer and software development engineer, or university names Stanford and Leland Stanford University).

The opportunity map generation module is configured to generate an opportunity map that provides available opportunities to users based on transitions or real users who have previously held that position. The opportunity map may be generated from parsed resumes or profiles using machine learning, natural language and/or statistical techniques to normalize the data. The opportunity map may pre-compute answers to frequently asked questions to provide a highly responsive and interactive experience for the users. The opportunity map generation module includes intelligence for backup strategies to present other relevant data to the user when the opportunity network system may not have sufficient data or information to precisely answer the user's query.

The metadata synthesis module synthesizes entities and/or metadata that are obtained from resumes or profiles of users that are directly entered in the opportunity network system or from information that is imported by users. The position detail profile generation module generates a position detail profile for the desired position based on people who are currently in that position or who may have previously worked at the position. In one embodiment, the position detail profile is a profile on the position that is built out of public information (e.g. users information available in public networks like LinkedIn®, Facebook®, etc.) and the resumes or profiles of people who are currently in that position. The position detail profile may include different section as follows: (a) users currently in that position or who previously held that position, (b) recruiters who source for the position, (c) hiring managers for the position, (d) salary range for the position, (e) growth or decline of such positions in industry, (f) typical interview questions for such a position, or (g) employee feedback on culture for company and for the position and the metadata is obtained from any of the comprehensive database of resumes or profiles, a job portal or a professional networking websites.

In an embodiment, the position detail profile is calculated based on actual resumes or profiles of the users. For example, if the resume or profile includes following details: (a) position A (2014-Present), (b) position B (2012-2014), (c) educational details (e.g. school A, degree A, major A) (2008-2012) and (d) skills (e.g. skill A, skill B, skill C). For the position detail profile for the position A, the opportunity network system may add Position B as a previous position and Skills A, B and C as skills for people who currently working in that position or who previously worked in that position. The position detail profile is computed by processing all the resumes or profiles of people who currently working in that position or who previously worked in that position.

The opportunity network system may analyze the resumes or profiles of the users who currently working in a particular position and shows (a) skills and certifications of the user in the particular role, (b) background information of the user (e.g. education, majors, degrees, etc.), and (c) career paths (e.g. previous and possible subsequent positions of the user in the particular role). In one embodiment, the opportunity network system aggregates the skills of the users from the resumes or profiles of the users who are currently working in the particular role for the skills section.

The position compatibility module may dynamically compute a compatibility report and/or compatibility score for (i) a given profile or resume information of the user, (ii) the position detail profile for a given position, and (iii) a specific job description that the user is interested in applying for. The position compatibility module may compute the most important requirements from a job description and use that to match the user's fit with that specific position.

The dashboard personalization module may compute a set of cards that provide a preview of personalized questions that the opportunity network system can answer for the users. The dashboard personalization module computes the set of cards based on the information provided by the user at the beginning of a session (e.g. the company and title/position within the company). Examples of the cards that may be displayed on the dashboard include (i) a next opportunities from the current position of the user and (ii) any other company in a current city of the user that hire people with the present title/position of the user, etc. The opportunity network system may dynamically change/update a dashboard when the users change/update the profile information (e.g. educational information of the user, current position of the user, location of the user).

The user interaction module tracks various interactions of the specific user with the opportunity network system, which can subsequently be utilized to offer a good customer experience across devices (e.g. mobile apps and web), analytics, recommendations, intelligent suggestions, future notifications etc.

The message generation module may allow the user to sign up into the opportunity network system and allows the user to showcase their profile, and for what topic the user is open to receiving messages. The message generation module may provide a rich search option to the user to search for people and to send messages to another user, which are received only when the messaging preferences of the user (e.g. who going to receive the message) are met. The message generation module may reference a people directory that stores profiles of users. In an embodiment, the message generation module allows the users to communicate with the opportunity network system via communication network or a social media platform.

In one embodiment, the opportunity network system may identify relevant people who can help by providing additional information or mentoring on given position when the user is looking to learn more about a particular position.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description.

Referring now to the drawings, and more particularly to FIGS. 1 through 18, where similar reference characters denote corresponding features consistently throughout the figures, preferred embodiments are shown. Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

FIG. 1 illustrates an opportunity network system 106 that obtains entity information from a plurality of users 102A-N and websites 110 to generate an opportunity map for a user 102A according to an embodiment herein. The opportunity network system 106 generates the opportunity map that provides visibility to a comprehensive landscape of relevant opportunities for any user 102A. The plurality of users 102A-N may be professionals and/or students. The opportunity map may be generated based on (a) information entered into the opportunity network system 106 by the user 102A, (b) one or more resumes or profiles directly imported to from cloud 109 by the user 102A (c) information from a data-analysis of a plurality of resumes or profiles of the user 102A available in the websites 110, and (d) one or more resumes or profiles directly imported to the opportunity network system 106 by the user 102A. The opportunity map includes a plurality of possible subsequent positions. Each possible subsequent position of the opportunity map represents a distinct target position that the user 102A may be able to transition to (within the same company (e.g. a current company) of the user 102A or at different companies/institutions) based on transitions made by real people (e.g. users) with similar backgrounds in the past. The opportunity network system 106 extracts information from publically available websites 110 through a network 108 and stores the extracted information (e.g. entity information of the plurality of users 102A-N) in a database associated with the opportunity network system 106. In one embodiment, the database stores the entity information that directly received from the plurality of users 102A-N using the opportunity network system 106. In an embodiment, the extracted information is stored in a server. The opportunity network system 106 is operated in a computing device 104. In one embodiment, the opportunity network system 106 is operated in the server to generate the opportunity map. The computing device may be but is not limited to a server, a distributed network of servers, a laptop, a mobile phone, a tablet, and/or a personal computer, etc.

Figure 2:
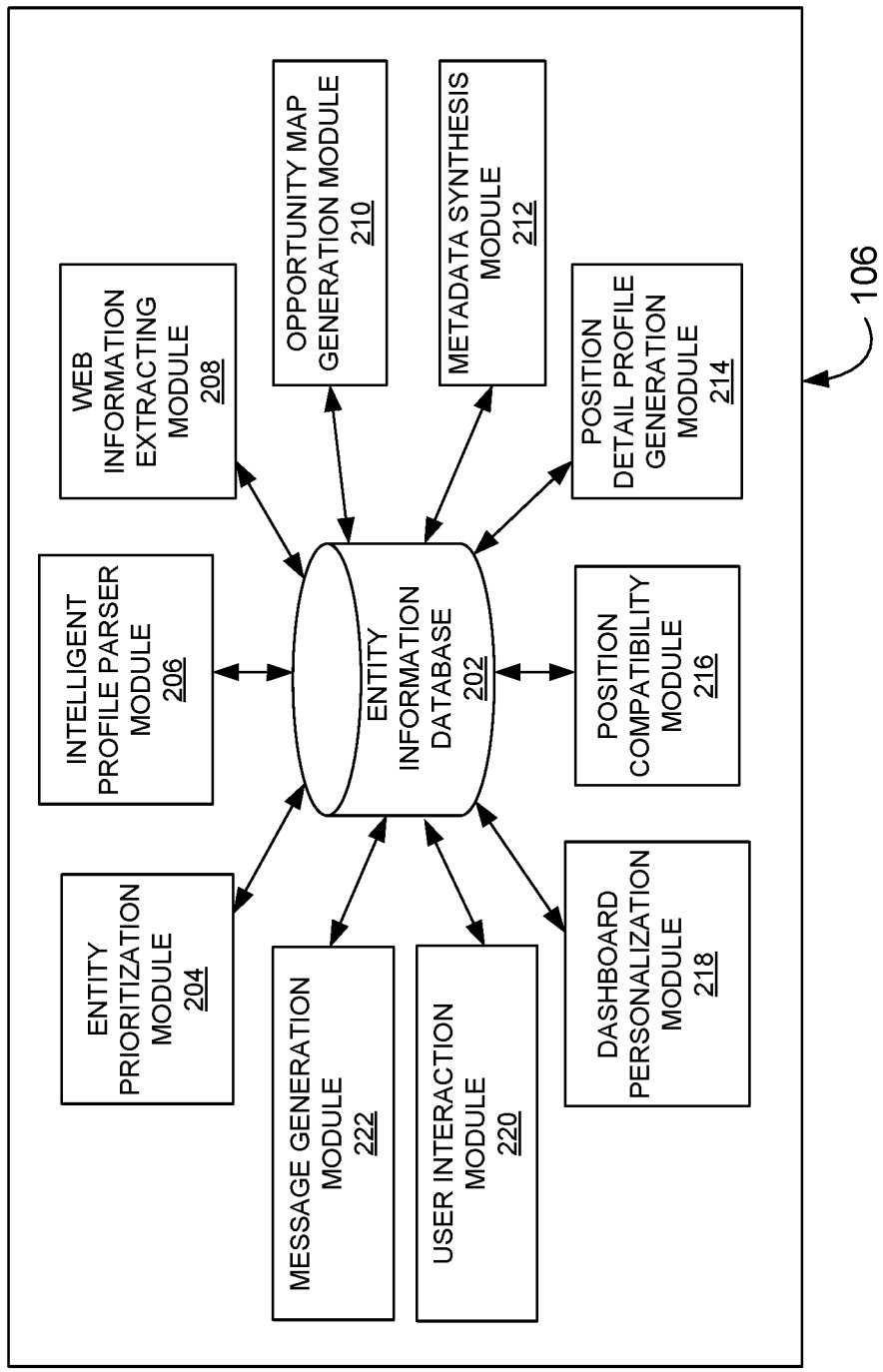
FIG. 2 illustrates an exploded view of the opportunity network system of FIG. 1 according to an embodiment herein.

FIG. 2 illustrates an exploded view of the opportunity network system 106 of FIG. 1 according to an embodiment herein. The opportunity network system 106 includes a entity information database 202, an entity prioritization module 204, an intelligent profile parser module 206, a web information extracting module 208, an opportunity map generation module 210, a metadata synthesis module 212, a position detail profile generation module 214, a position compatibility module 216, a dashboard personalization module 218, a user interaction module 220 and a message generation module 222. These modules function as has been described above.

Figure 3A:
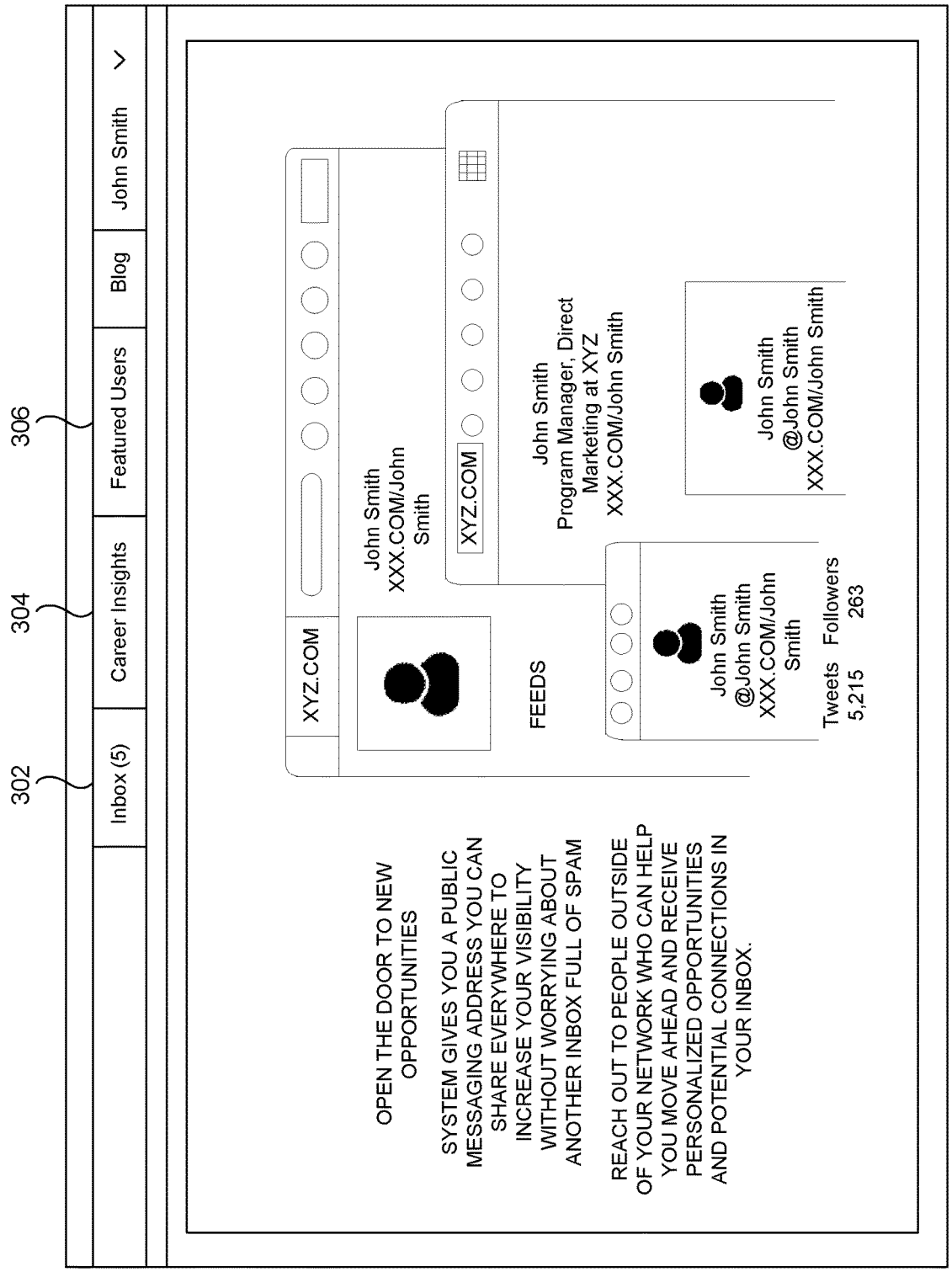

FIGS. 3A and 3B illustrate user interface views of an opportunity network system 106 of FIG. 1 according to an embodiment herein. The user interface view of the opportunity network system 106 includes (a) an inbox tab 302 that shows one or messages received from any of the plurality of users 102A-N, (b) a career insights tab 304 that provides one or more possible subsequent positions for the plurality of users 102A-N, (c) a featured users tab 306 that displays users of the opportunity network system 106. The user interface view of the opportunity network system 106 may include a dashboard tab that provides a preview of personalized questions that the opportunity network system 106 can answer for the plurality of the users 102A-N. When the user enters into the opportunity network system 106, the opportunity network system 106 directs the user 102A to sign up with or log on to the opportunity network system 106.

The user interface views of the opportunity network system 106 allow the user 102A to explore new possibilities in his/her career. The opportunity network system 106 provides full visibility to career choices of the user 102A. The opportunity network system 106 obtains unique insights of user 102A and converts it into roles that the user 102A may be interested in. The opportunity network system 106 understands compatibility of the user 102A with any job.

Figure 4A:
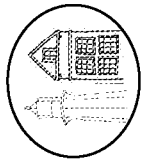
FIG. 4A illustrates a user interface view of a personalized dashboard that provides opportunities for a user based on their current position according to an embodiment herein.

FIG. 4A illustrates a user interface view of a personalized dashboard that provides opportunities for the user 102A based on their current position according to an embodiment herein. The dashboard may be generated based on top questions that the opportunity network system 106 answers for the user 102A based on the information of the user 102A (e.g. a current position, an educational background, a current location of the user 102A etc.). The dashboard may provide next opportunities from the current position of the user 102A when the user 102A selects 'see your career map'. The dashboard also provides one or more companies that are hiring in a location specified by the user 102A which hires people with the present title/position of the user 102A etc. The dashboard allows the user 102A to see the next opportunities that are identified for a different position. For example, if the user 102A has two past positions (e.g. software development engineer and software testing engineer), the dashboard allows the user 102A to see the next possible opportunities for both the software development engineer and the software testing engineer separately. The dashboard also provides a list of companies that hire people like the user. The dashboard may further provide (a) companies that hire for the title that is the same or equivalent as the current title of the user 102A in other locations, (b) where the alumni from the same school as the user 102A have gone to, (c) an option to start with a different position (e.g. explore as someone else).

FIG. 4B illustrates a user interface view of a personalized dashboard that provides one or more options to the user 102A to get a different opportunities for the user 102A based on their interest according to an embodiment herein. The one or more options includes (a) compare company that allows the user 102A to compare one or more companies (e.g. compare people movement, job titles and pay between companies), (b) top job market to get a plurality of cities with the most jobs for people with a same title as the user 102A currently has, (c) make more money to filter the job opportunities by salary (e.g. that provides the possible subsequent positions which pay more than the current job) and (d) explore background and skills to explore background, skills, salaries, and job histories of plurality of users 102A-N in a specific position.

The dashboard may include a discover opportunity tab, a dig deep tab, a gain confidence tab and a conversation tab. The discover opportunity tab analyses job transitions of others to show potential transition opportunities. The dig deep tab provides an opportunity to learn about skills, backgrounds, and education of people in positions desired by the user 102A. The gain confidence tab provide a compatibility report and score for (i) a given profile/CV/resume information for the user 102A, (ii) a position detail profile for a given position for the user 102A, and (iii) a specific job-description that the user 102A is interested in applying for. The conversation tab provides an option to connect with another user who may help to the user 102A (e.g., by mentoring or connecting the user 102A with recruiters etc). The conversation tab may provide an option to safely send a message to the other user.

Figure 5:
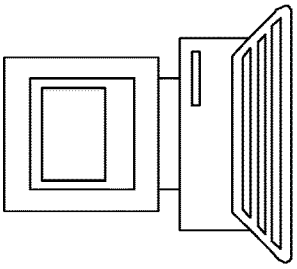
FIG. 5 illustrates a user interface view of creating a profile in the opportunity network system of FIG. 1 using an existing profile according to an embodiment herein.

FIG. 5 illustrates a user interface view of creating a profile in an opportunity network system 106 of FIG. 1 according to an embodiment herein. Once the user 102A logs on to the opportunity network system 106, the opportunity network system 106 asks for importing professional details of the user 102A from a professional networking website. The user interface view provides four steps to create a profile in the opportunity network system 106. The user interface view allows the user 102A to select the step 1 to open the professional networking website. In step 2, the opportunity network system 106 instructs the user 102A to expand every section in a profile. In step 3, the opportunity network system 106 instructs the user 102A to copy professional details of the user 102A from the profile of the professional networking website. In step 4, the opportunity network system 106 allows the user 102A to paste the professional details of the user 102A and selects a done option. After selecting the done option, the opportunity network system 106 obtains the professional details and identifies educational details, skills, certifications and work experience, past companies and positions from the professional details using natural language processing techniques. The opportunity network system 106 fetches specific information of the user 102A from the professional details and updates the specific information in a specific field (e.g. the opportunity network system 106 fetches the educational details from the professional details and updates an educational field in the opportunity network system 106) to create a profile for the user 102A in the opportunity network system 106. This may eliminates efforts taken by the user 102A to fill multiple columns individually to create the profile for the user 102A.

Figure 6A:

FIGS. 6A and 6B illustrate user interface views of a career insights tab 304 of FIGS. 3A and 3B according to an embodiment herein. The user interface views of the career insights tab 304 provide what's next to the user 102A (e.g. possible subsequent positions). The user interface views of the career insights tab 304 provides the possible subsequent positions for the user 102A when the user 102A selects see next step option. The user interface views of the career insights tab 304 also provides a plurality of roles taken by people who graduated from the same university. The user interface views of the career insights tab 304 provide the plurality of roles when the user 102A selects a see all option. The user interface views of the career insights tab 304 provides information on where the user 102A could work.

For example, the opportunity network system 106 identifies where the people who graduated from the same university are working, where the user 102A does, and suggests the locations (e.g. Menlo Park, San Francisco, Redmond etc.) for the user 102A to work. The user interface views of the career insights tab 304 allows the users to explore background details, skills, salaries, and job histories of people in a position that the user 102A aspires to and allows the user to check how the background details compare to the position that the user 102A aspires to. The opportunity network system 106 provides a career selection option to students after completing a degree (e.g. provides next steps after completing a degree and companies that hire alumni in a location). The opportunity network system 106 provides an opportunity map for students that provide one or more possible subsequent positions for a student after completing the degree when selecting next steps after completing the degree (as explained in FIG. 13).

Similarly, when selecting companies that hire alumni in a location, the opportunity network system 106 provides an opportunity map for the user 102A based on alumni hired by the companies in a specific location (as explained in FIG. 14). The opportunity network system 106 provides a career improvement/growth option to professionals (e.g. where people go next after leaving a specific position, companies that hire for a title in a specific location and backgrounds, skills & salary of any position).

When selecting where people go next after leaving a specific position, the opportunity network system 106 provides an opportunity map for professionals that provide one or more possible subsequent positions for professionals after leaving the specific position in a company (as explained in FIG. 8A). Similarly, the opportunity network system 106 provides an opportunity map for professionals that provide one or more possible subsequent positions for professionals based on specific title in the specific location when selecting companies that hire for a title in a specific location (as explained in FIG. 9). Similarly, the opportunity network system 106 provides an opportunity map for professionals that provide one or more possible subsequent positions for professionals based backgrounds, skills and salary of any position when selecting backgrounds, skills & salary of any position (as explained in FIGS. 10A and 10B).

Figure 7A:
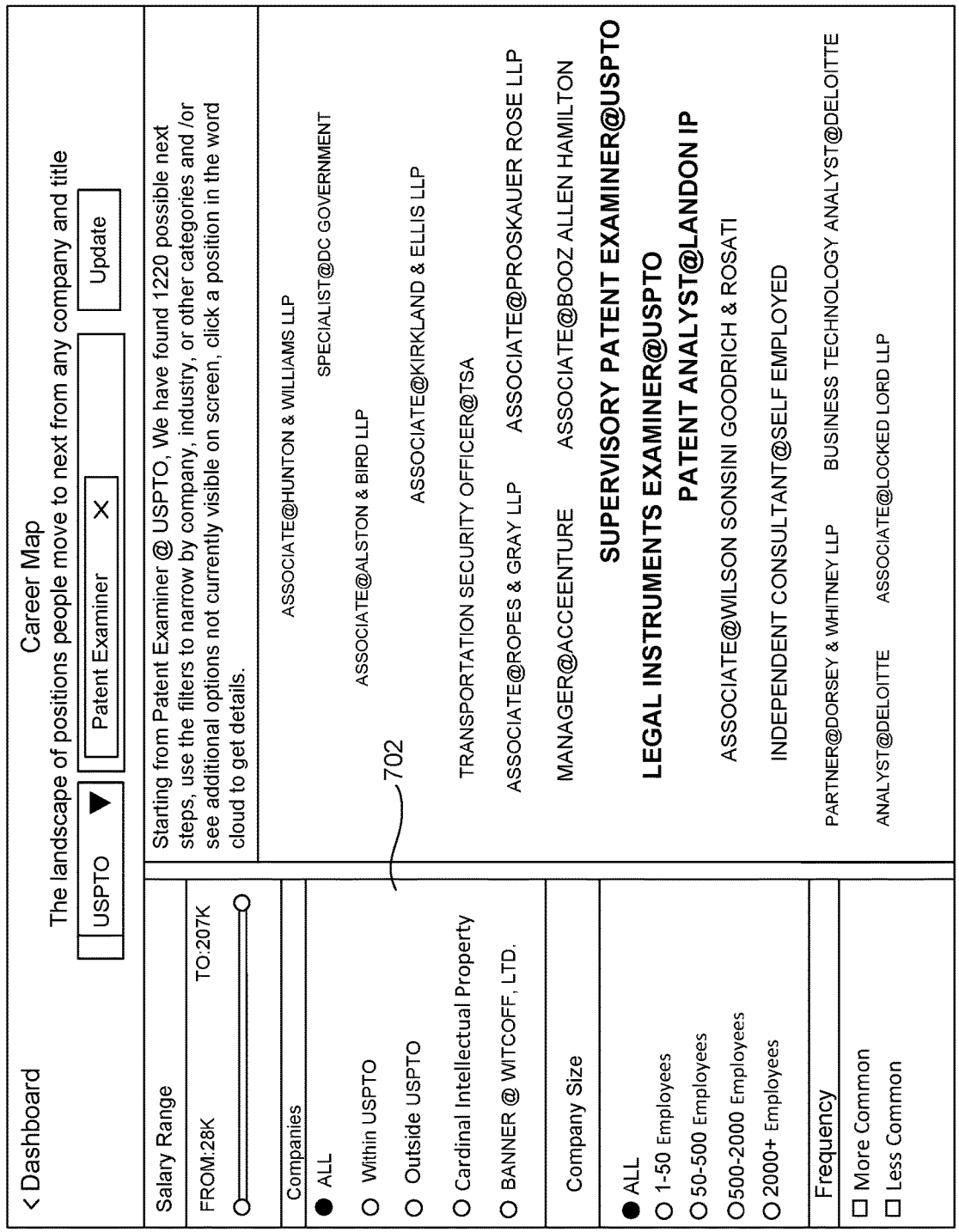
FIG. 7A illustrates a user interface view of an opportunity map generated by the opportunity network system of FIG. 1 according to an embodiment herein.

FIG. 7A illustrate a user interface view of an opportunity map generated by the opportunity network system 106 of FIG. 1 according to an embodiment herein. The opportunity map takes as input the current position of the user 102A and other equivalent positions within the same company (e.g. starting from the title of Software Engineer, Software Development Engineer@ Amazon®, patent Analyst@ Landon IP, Primary Patent Examiner@ USPTO, the opportunity network system 106 found 5 possible next steps/positions based on resumes or profiles of users who were in the same position as the user 102A). The opportunity network system 106 may provide the possible subsequent positions through the opportunity map when selecting a current position. The opportunity network system 106 may provide a filter option 702 to the user 102A to filter opportunities based on (a) salary range, (b) company name, (c) company size, (d) frequency of the companies, and/or (e) industry type. In an embodiment, the user interface view of the opportunity map displays most transitioned positions in a center of the opportunity map. In another embodiment, the user interface view of the opportunity map displays most transitioned positions in a different font size and/or a different text color (e.g. supervisory patent examiner@uspto and legal instruments examiner@uspto are most transitioned positions by patent examiners).

FIG. 7B illustrates a user interface view of an opportunity map that provides brief information of position details according to an embodiment herein. The user interface view shows pop-up that provides brief details about a company, a position details (e.g. salary information, job description etc.) and a link for further information when selecting the particular position that is displayed in the opportunity map. In an embodiment, the user interface view of the opportunity map provides the brief information of position details through a popup window when the user 102A navigates a cursor on any one of subsequent position. When selecting learn more option, the user interface view of the opportunity map displays a full position detail profile for a particular position.

Figure 8B:
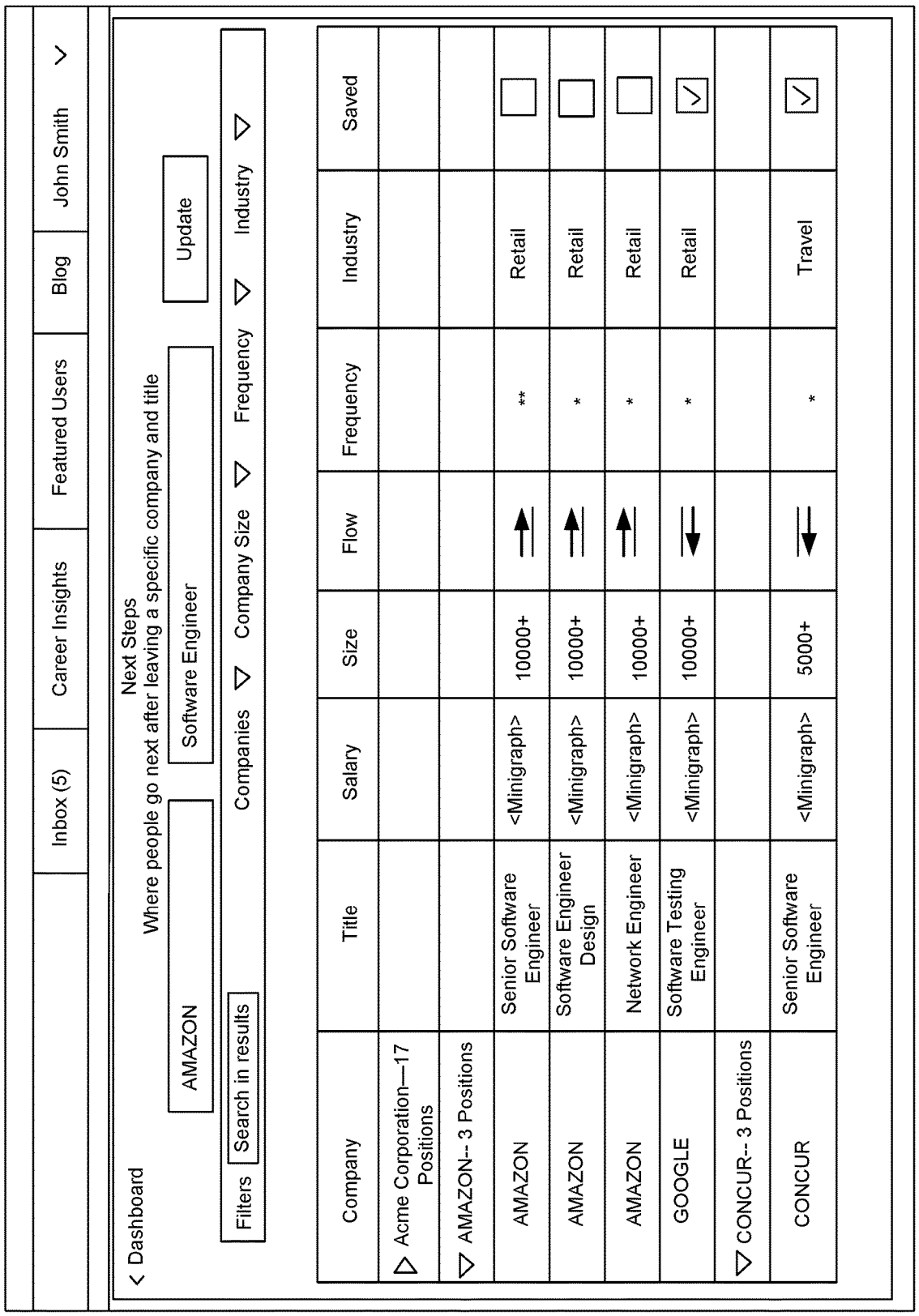

FIGS. 8A and 8B illustrate user interface views of a grid view of an opportunity map that provides one or more subsequent possible positions after leaving a specific position according to an embodiment herein. The opportunity network system 106 provides the grid view that displays one or more possible subsequent positions when the user 102 select where people go next after leaving a specific position under professionals tab from system tools that is depicted in FIG. 6B. The grid view allows the user 102A to sort the possible subsequent positions via a grid header (e.g. using companies, company size, frequency and industry). The grid view includes support text, links and images for the company profile and job description. In one embodiment, the grid view provides job details via a pop-up window when moving a mouse cursor over the position. The grid view replaces existing pop-up with a smaller new pop-up which appear on mouse over for new position. When selecting the company or the position, the grid view opens a position detail page that provides necessary details to the user 102A about the position and the company. The grid view includes (a) a company name filed that represents names of companies listed, (b) a title field that represents a title for a position, (c) a salary field that represents a salary associated with the position, (d) a size field that represents how many employees working in the company, (e) a flow filed that represents whether the user 102 transition to the possible subsequent position within the company or some other company (e.g. an outgoing arrow represents the user 102A transition to the next position within the company and an incoming arrow represents the user 102A transition to the possible subsequent position from any other company), (f) a frequency field that represents how many people previously made the transition to the specific position, (g) an industry field that represents an industry type (e.g. Retail or travel), (h) a save filed that enables the user 102A to select the one or more possible subsequent positions and save the selected possible subsequent positions. The grid view provides a grouping option (as depicted in FIG. 8B) to group one or more positions from the same company (e.g. 17 positions from Acme Corporation is grouped and displayed in FIG. 8B). The grid view allows the user 102A to track the position based on whether the user 102A has read or unread the position. The grid view includes a horizontal scrolling option to view the entire set of positions that are displayed in the grid view. The grid view allows the user 102A to select one or more positions and save the selected positions in a database associated with the opportunity network system 106.

FIG. 9 illustrates a user interface view of an opportunity map specific to a location where companies hire for a specific title according to an embodiment herein. The opportunity network system 106 provides the user interface view of the opportunity map specific to the location when the user 102 selects 'companies that hire for a title in a specific location' under professionals tab from system tools that is depicted in FIG. 6B. The user interface view provides one or more possible subsequent positions that are specific to a particular location that is selected by the user 102A. For example, FIG. 9 displays a financial analyst position from various companies (e.g. IBM®, Goldman Sachs®, Wells Fargo® etc.) in New York City. The user interface view provides (a) a company name field that represents that represents names of companies listed, (b) a title field that represents a title for a specific position, (c) a title count field that represents how many people previously made the transition to the given position in the specific location, (d) a company size field that represents size of a company (e.g. a larger scale company or middle scale company) and (e) a salary field that represents a salary associated with the specific position in each company. The user interface view allows the user 102A to filter the result by entering a specific company. For example, if one enters the company name as IBM® in a search field, the user interface view displays position details specific to IBM®. The user interface view may allow the user 102A to filter the results using (a) a salary range, (b) a company size, (c) number of positions and (d) an industry type etc.

FIGS. 10A and 10B illustrate user interface views of an opportunity map that provide position details for a specific position to users according to an embodiment herein. The opportunity network system 106 provides the user interface view of the opportunity map specific to background of the user 102A when the user 102A select 'backgrounds, skills and salary of any position' under a professionals tab from system tools that is depicted in FIG. 6B. The user interface provides ability to dig deep (e.g. detailed information) about any position that displayed in the opportunity map. The user interface provides a summary view and great set of curated resources from the websites 110. The user interface views provide a compatibility score for the user 102A for a selected position (e.g. Associate@ Goodwin Procter LLP or Primary Patent Examiner@ USPTO). For example, the user interface provides the compatibility score as 76% for associate at a company Goodwin Procter LLP and as 85% for Primary Patent Examiner at the USPTO. The user interface views provide an average salary associated with selected/given positions (e.g. Salary for Associate at Goodwin Procter LLP: Min: $160K, Median: $185K, Max: $230K and an average salary for primary patent examiner at USPTO: $125 k). The user interface views may allow the user 102A to enter a salary range for the selected/given position.

The opportunity network system 106 explores background, skills, and job history of the plurality of users 102A-N in a specific position to calculate a compatibility score for the user 102A. The user interface views provide entities required for the selected position (e.g. skills required for the selected/given position, years of experience required for the selected/given position, schools, majors and certifications that are required for the selected/given position etc.). The user interface views provide option to search for the people who are working in the selected position. The user interface views dynamically provide a career pathway that displays a previous position of the user 102A and a suggested possible subsequent position after the selected position (e.g. Associate@ Goodwin Procter LLP or Primary Patent Examiner@ USPTO) for the user 102A.

For example, when the user 102A gives a position title as associate at a company Goodwin Procter LLP, the career pathway provides the previous positions as associate at Latham & Watkins and summer Associate at Goodwin Procter LLP. Further the career pathway provides possible subsequent positions as Partner at Goodwin Procter LLP and Of Counsel at Goodwin Procter LLP (as depicted in FIG. 10A). Further for example, when the user 102A provides a position title as Primary Patent Examiner at USPTO, the career pathway provides previous positions as Assistant Patent Examiner at USPTO, any other position at USPTO and Patent Examiner at USPTO. Further the career pathway provides possible subsequent positions as Supervisory Patent Examiner at USPTO, Patent Attorney at USPTO and Associate at Ropes & Gray LLP (as depicted in FIG. 10B).

The next position for the user 102A is identified based on resumes or profiles of the people who previously worked in the same position as the user 102A. For example, if the user 102A was a "software engineer" at Microsoft®, the opportunity network system 106 looks for the resumes or profiles of the people who were "software engineers" at Microsoft®, but who have left that position. The opportunity network system 106 gets the list of all such next positions and weights them based how long ago the user 102A made the move to the next position, and a frequency (e.g. how many people made that transition).

FIG. 11 illustrates a user interface view of a map of skills (e.g. also known as a skills map) of users who are currently in a selected position according to an embodiment herein. The skills map is generated based on the skills of users who are currently in the selected position. The skill map represents the skills that are required for the users for a given position in a particular company (e.g. Software Engineer and Software Development Engineer at Amazon®). The skill map may display highly required skills for the user 102A for the given position in a different font size and/or a different text color. The skill map may display required skills for the user 102A in centre of the skill map. In an embodiment, if the user 102A does not have any particular skill associated with the selected position, the skill map may help the user 102A to identify the missing skill associated with the selected position and learn the missing skill to succeed in obtaining the selected position.

FIG. 12 illustrates a user interface view of map of schools that illustrates a plurality of schools attended by users who are currently working in the selected position according to an embodiment herein. The user interface view of the map of schools may also provide a list of schools attended by users who have previously worked in the selected position.

FIG. 13 illustrates a user interface view of an opportunity map for students according to an embodiment herein. The opportunity network system 106 provides the user interface view of the opportunity map for students when the user 102A selects 'next steps after completing a degree' under a students tab from system tools that is depicted in FIG. 6B. The opportunity map for students provides the landscape of opportunities (e.g. possible subsequent positions) for a student based on positions that other students with the same educational background moved to after finishing their educational program. For example, the user interface view shows the current positions held by others after completing a bachelor's degree in computer science at Carnegie Mellon University. The user interface view provides an option to filter the choices (e.g. possible subsequent positions) offered based on (a) salary range, (b) time period of the course in a school/university (e.g. years of graduation), (c) career type, (d) company size, (e) frequency of the companies, and (f) industry type. In addition, the user interface allows filtering choices using keyword searches (e.g. by entering an organization name and title of a position). The user interface view provides (a) an organization name field that represents a name of organizations, (b) a title/program field that represents a title for various positions that are listed, (c) a frequency field that represents how many people previously made the transition to the specific position, (d) a company size field that represents size of a company (e.g. a larger scale company or a middle scale company) and (e) a salary field that represents a salary associated with each position in different companies.

FIG. 14 illustrates a user interface view of an opportunity map specific to companies that hire alumni in a specific location according to an embodiment herein. The opportunity network system 106 provides the user interface view of the opportunity map for students when the user 102A selects 'companies that hire alumni in a location' under a students tab from system tools that is depicted in FIG. 6B. The user interface view of the opportunity map provides the landscape of opportunities (e.g. possible subsequent positions) for the user 102A based on alumni hired by the companies in a specific location. For example, the user interface view shows the companies that hire alumni in New York City after completing a bachelor's degree in computer science at Carnegie Mellon University. The user interface view provides an option to filter the choices (e.g. the companies) offered based on (a) company size and (b) industry type. In addition, the user interface allows filtering choices using keyword searches (e.g. by entering a company name). The user interface view provides (a) a company name field that represents a name of a company that hires the alumni, (b) an alumni count field that represents the number of people previously hired by each company and (c) a company size field that represents size of a company (e.g. a larger scale company or middle scale company).

Figure 15:
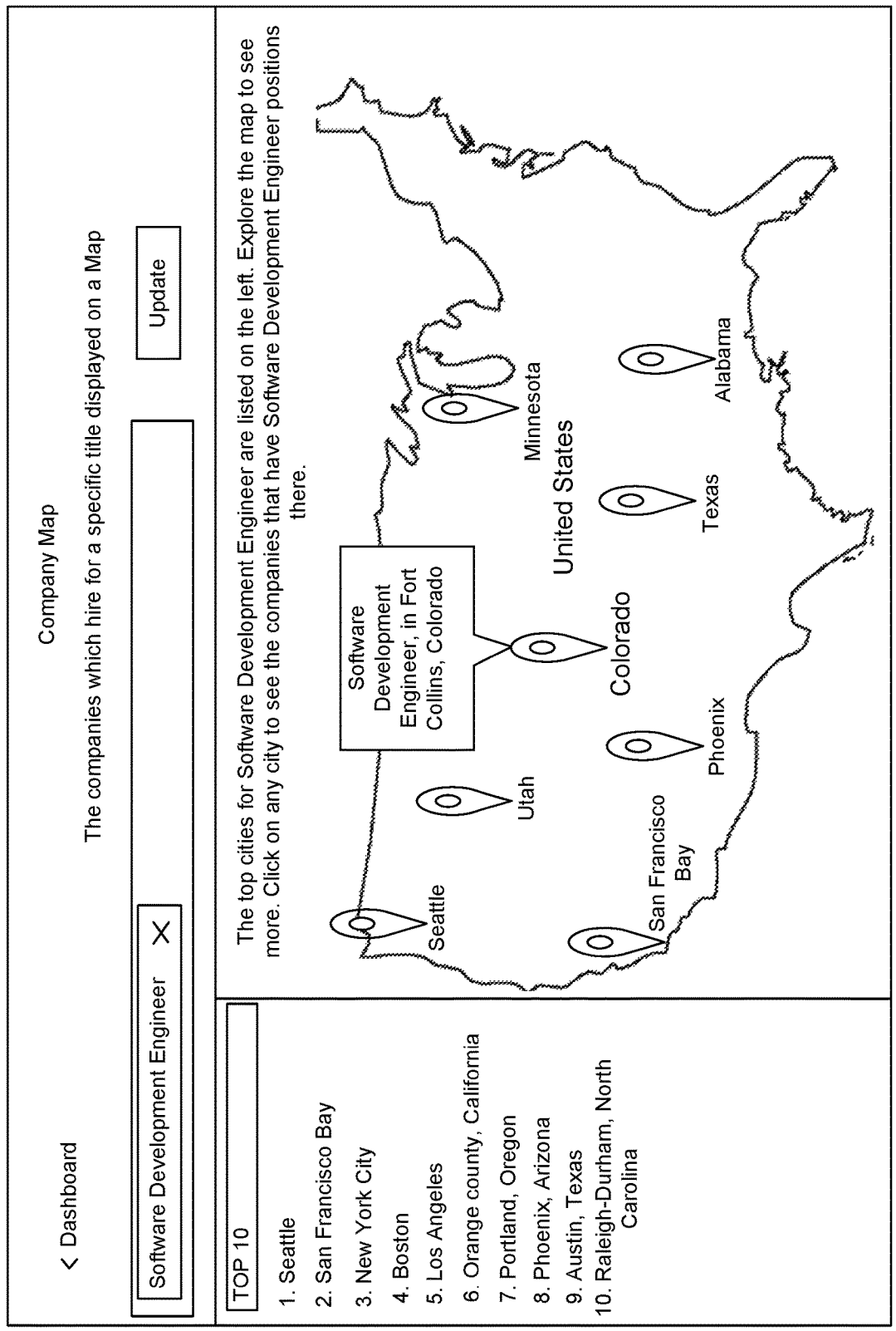
FIG. 15 illustrates an exemplary user interface view that shows a map of cities and companies within each city that hire for a particular position according to an embodiment herein.

FIG. 15 illustrates an exemplary user interface view that shows a map of cities and companies within each city that hire for a particular position according to an embodiment herein. The exemplary user interface view shows top cities that hire for the particular position (e.g. a software development engineer). In an embodiment, the user interface view shows the companies in the city that hire for the particular position based on a predefined ranking of the companies. The user interface view provides an option to the user 102A to search for the position in a company based on a current position of the user. In another embodiment, the user interface view provides an option to the user 102A to search for the position in the company in the particular city based on the experience of the user.

Figure 16A:
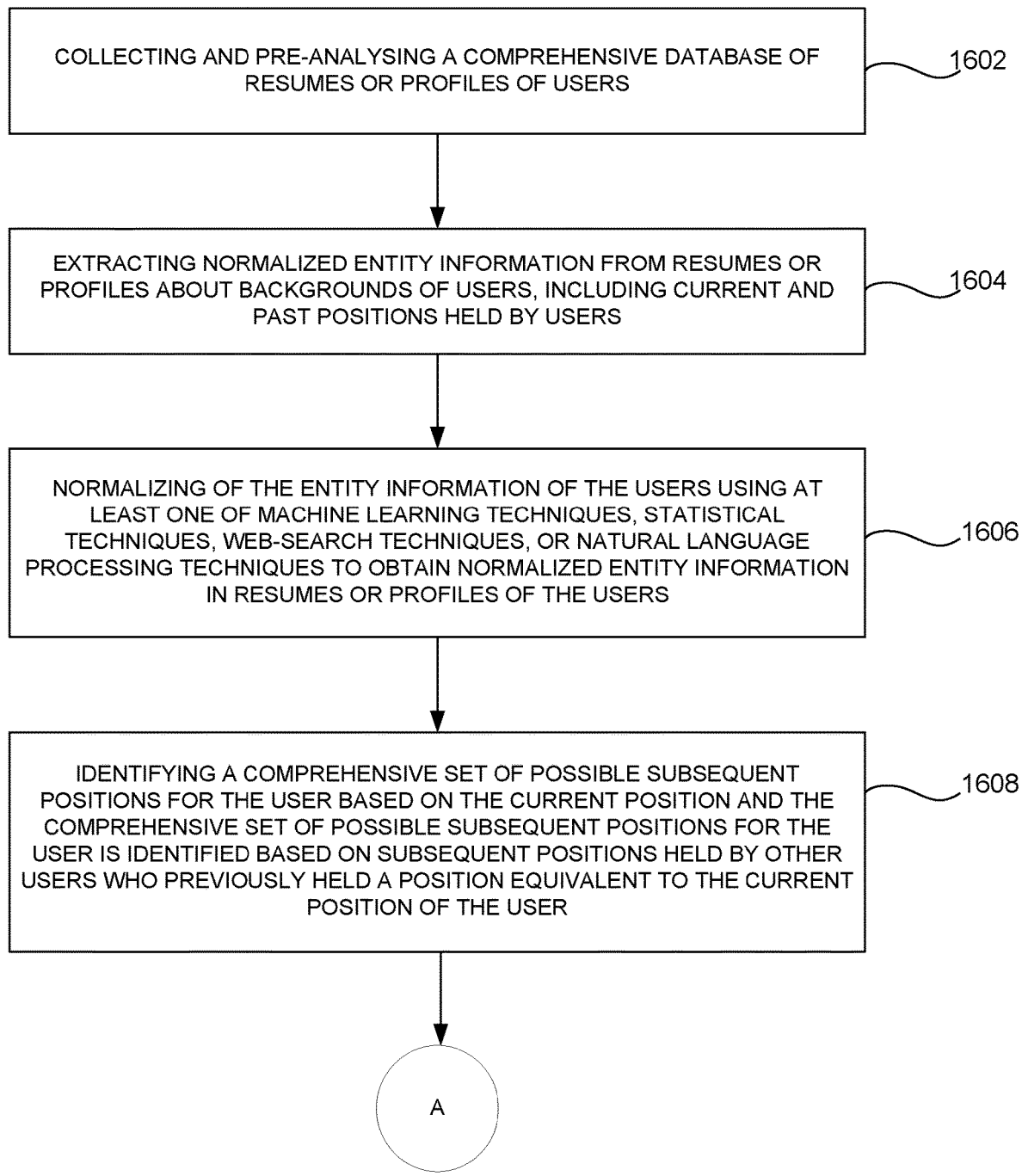
FIG. 16A-16B illustrates a method for comprehensively identifying and representing potential next positions based on a current position of the user of the opportunity network system according to an embodiment herein.
Figure 16B:
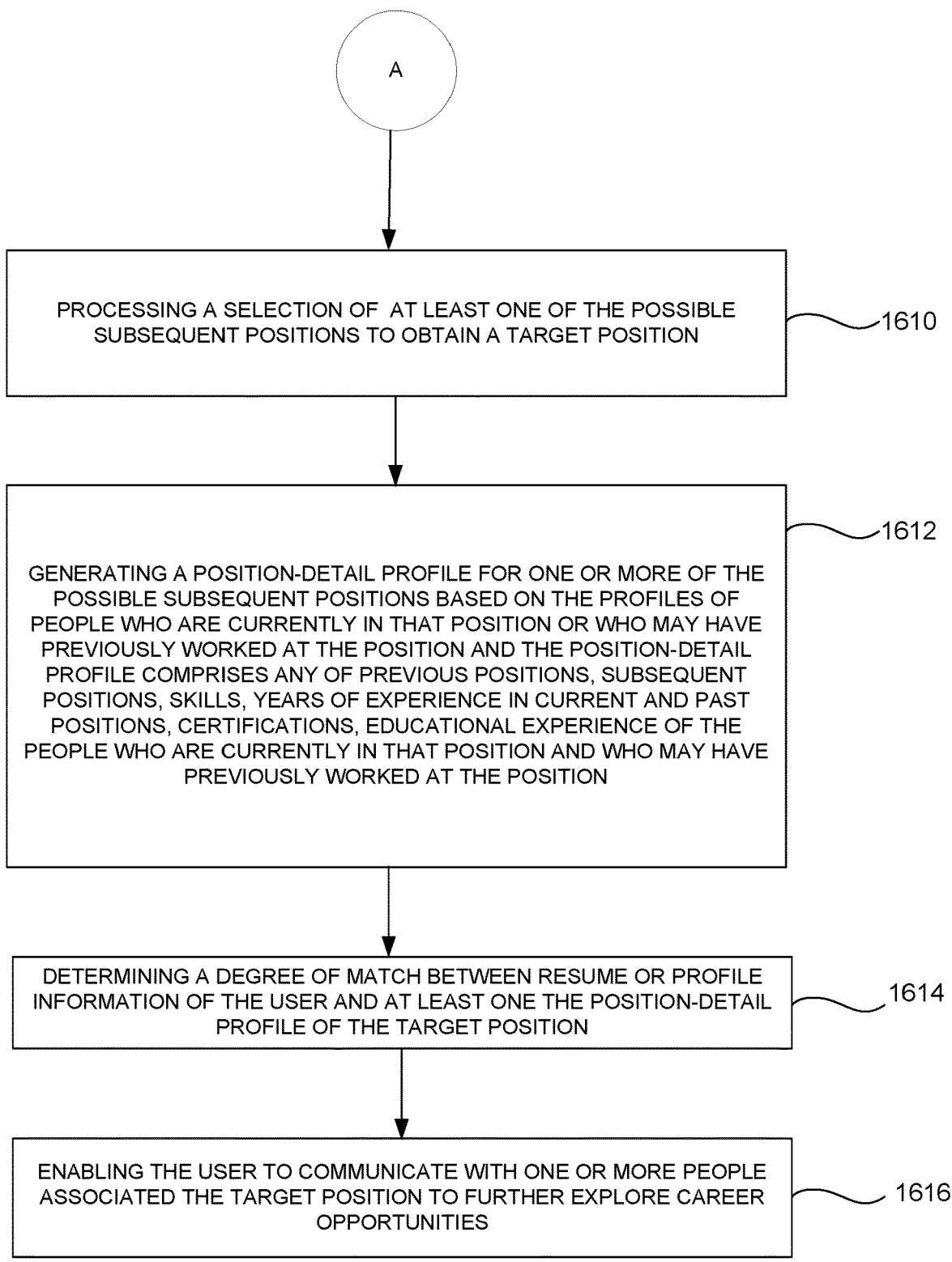
Figure 17:
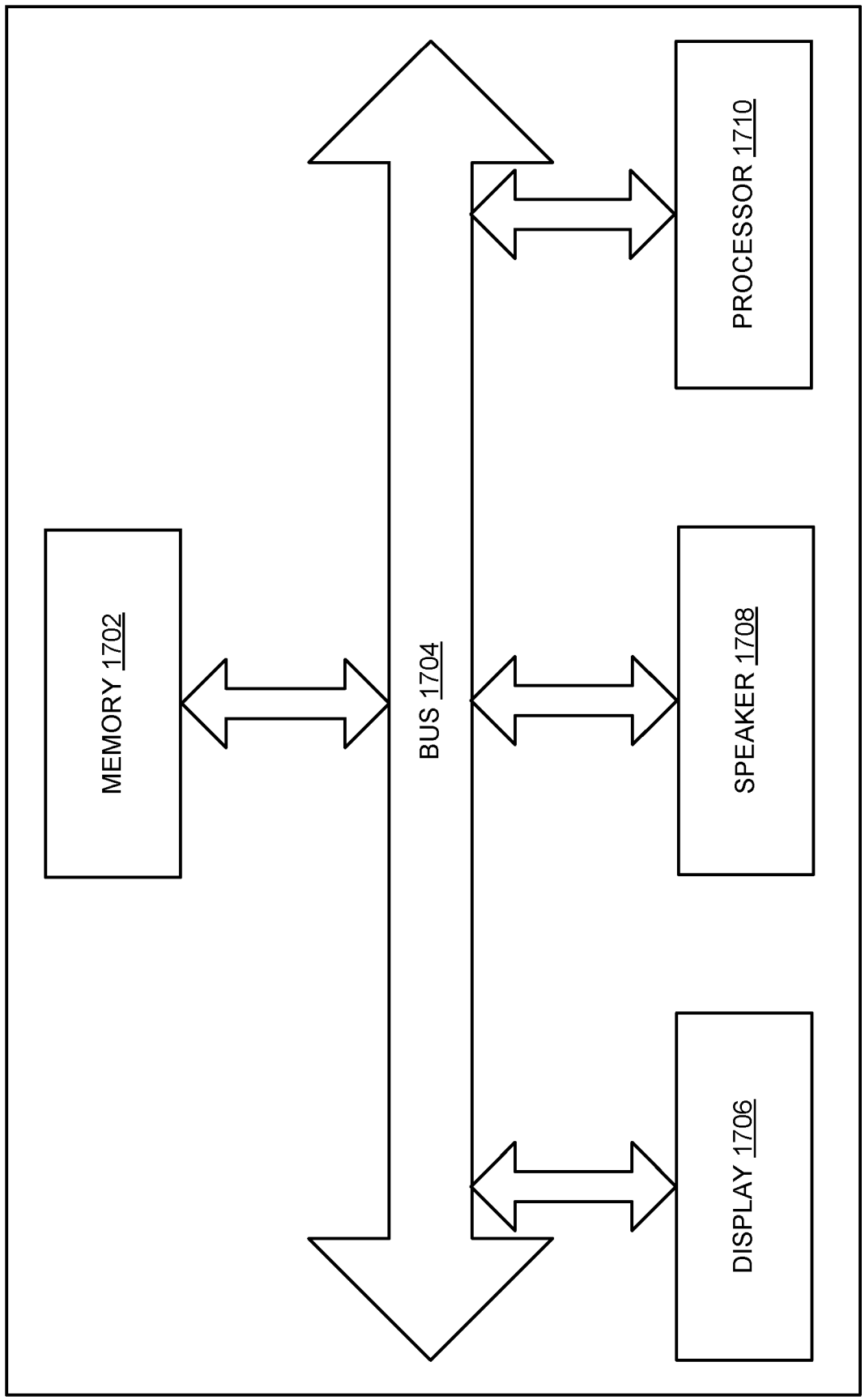
FIG. 17 illustrates an exploded view of a device that may be used to access the opportunity network system of FIG. 1 according to the embodiments herein.

FIG. 16A-16B illustrates a method for comprehensively identifying and representing potential next positions based on a current position of the user 102A of the opportunity network system 106 according to an embodiment herein. At step 1602, the opportunity network system 106 collects and pre-analysis a comprehensive database of resumes or profiles of users. At step 1604, the opportunity network system 106 extracts normalized entity information from resumes or profiles about backgrounds of users, including current and past positions held by users. At step 1606, the opportunity network system 106 normalizes the entity information of the users using at least one of machine learning techniques, statistical techniques, web-search techniques, or natural language processing techniques to obtain normalized entity information in resumes or profiles of the users. At step 1608, the opportunity network system 106 identifies a comprehensive set of possible subsequent positions for the user based on the current position and the comprehensive set of possible subsequent positions for the user is identified based on subsequent positions held by other users who previously held a position equivalent to the current position of the user. At step 1610, the opportunity network system 106 processes a selection of at least one of the possible subsequent positions to obtain a target position. At step 1612, the opportunity network system 106 generates a position-detail profile for one or more of the possible subsequent positions based on the profiles of people who are currently in that position or who may have previously worked at the position and the position-detail profile comprises any of previous positions, subsequent positions, skills, years of experience in current and past positions, certifications, educational experience of the people who are currently in that position and who may have previously worked at the position. At step 1614, the opportunity network system 106 determines a degree of match between resume or profile information of the user and at least one the position-detail profile of the target position. At step 1616, the opportunity network system 106 enables the user to communicate with one or more people associated the target position to further explore career opportunities FIG. 17 illustrates an exploded view of the personal communication device having a memory 1702 having a set of computer instructions, a bus 1704, a display 1706, a speaker 1708, and a processor 1710 capable of processing a set of instructions to perform any one or more of the methodologies herein, according to an embodiment herein. In one embodiment, the receiver may be the personal communication device. The processor 1710 may also enable digital content to be consumed in the form of video for output via one or more displays 1706 or audio for output via speaker and/or earphones 1708. The processor 1710 may also carry out the methods described herein and in accordance with the embodiments herein.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 18:
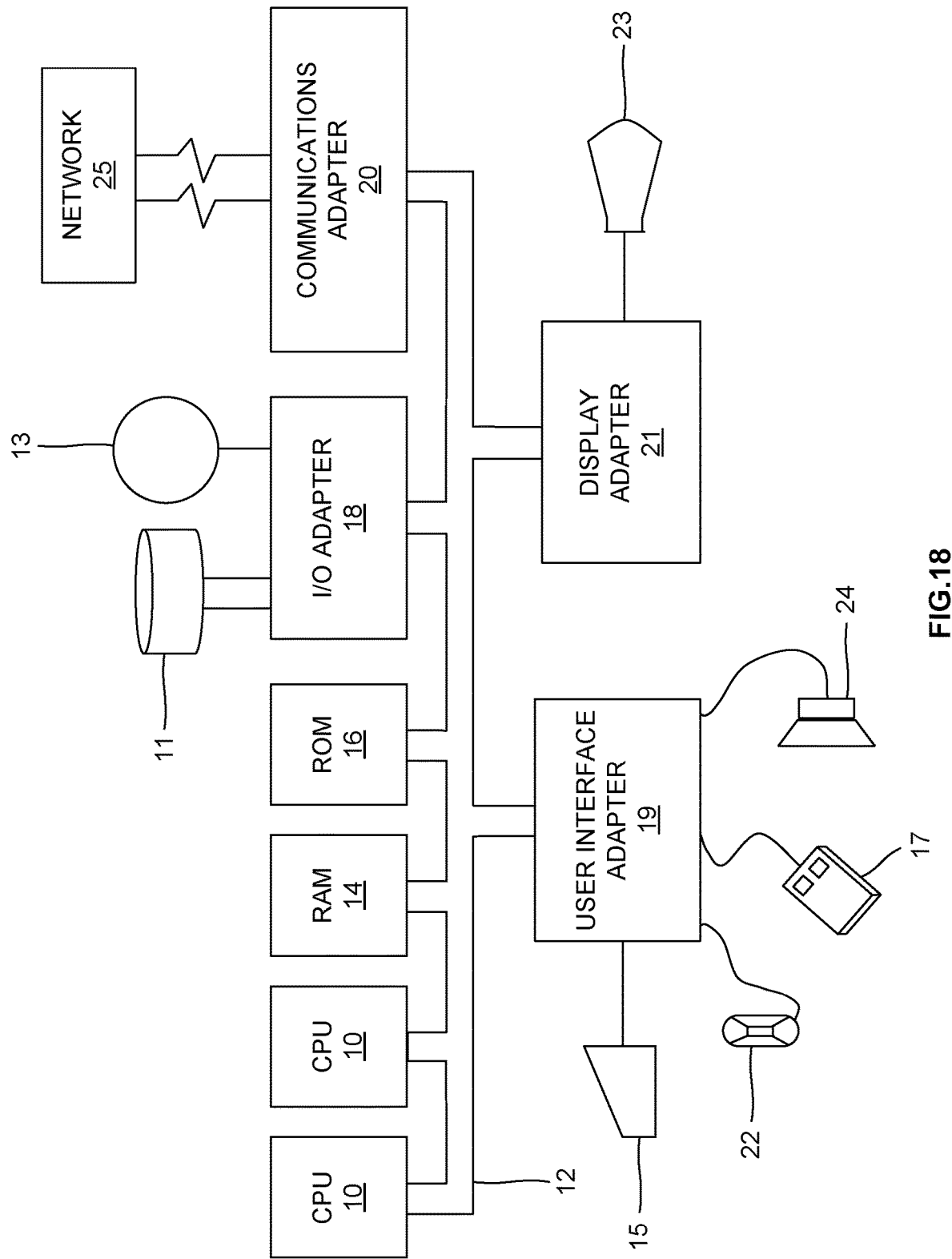
FIG. 18 a schematic diagram of computer architecture used in accordance with the embodiments herein.

A representative hardware environment for practicing the embodiments herein is depicted in FIG. 18. This schematic drawing illustrates a hardware configuration of an information handling/computer system in accordance with the embodiments herein. The system includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The opportunity network system 106 may provide a public directory for professionals, students and recruiters for the digital world to make their work easier. The opportunity network system 106 is the default messaging platform for outreach beyond immediate contacts. The opportunity network system 106 may provide an underlying profile and messaging platform for recruiting, direct messaging, sales-lead generation, online surveys, and online communities etc. The opportunity network system 106 can be used to discover skills required for long-term career growth. The opportunity map can be used to discover and access relevant external links, discussion boards, FAQ's that are associated with the role and transitions. The opportunity network system 106 further provides professionals the ability to freely explore different pathways and options and ask the "what if" career questions that are meaningful to the professionals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments.

What is claimed is:

1. One or more non-transitory computer readable storage mediums storing one or more sequences of instructions, which when executed by one or more processors provide career-insights to a user of an opportunity network system by determining potential next positions and a degree of match to a potential next position, by performing an automated method comprising:

collecting and pre-analyzing a comprehensive database of resumes or profiles of people; extracting normalized entity information from resumes or profiles about backgrounds of people, including current and past positions held by people;

analyzing of said entity information of said people using at least one of machine learning techniques, statistical techniques, web-search techniques, or natural language processing techniques to obtain normalized entity information from resumes or profiles of said people;

identifying and displaying a comprehensive set of possible subsequent positions for said user based on said current position held by said user, wherein said comprehensive set of possible subsequent positions for said user is identified by (i) identifying said people who have held at least one of a position that is equal to, or equivalent to, said current position held by said user and (ii) determining subsequent positions held by said people who previously held said at least one of said position that is equal to, or equivalent to said current position of said user;

processing a selection of at least one of said possible subsequent positions based on said comprehensive set of possible subsequent positions to obtain selected possible subsequent position;

automatically generating a position-detail profile for said selected possible subsequent position, wherein said position-detail profile is generated based on at least one of (a) profiles of people who are currently in said selected possible subsequent position or (b) profiles people who have previously worked at said selected possible subsequent position, wherein said position-detail profile comprises previous positions and subsequent positions of said people who are currently in said selected possible subsequent position or who may have previously worked at said selected possible subsequent position; and determining a degree of match between said resume or profiles information of said user and at least one said position-detail profile of said selected possible subsequent position by comparing said resume or profiles information of said user with said position-detail profile.

2. The one or more non-transitory computer readable storage mediums storing one or more sequences of instructions, which when executed by one or more processors of claim 1, further causes:

identifying areas of match and areas of mismatch between said resume or profile of user and said selected possible subsequent position based on said position-detail profile; and providing recommendations for acquiring any of skills, qualification or experiences to reduce mismatch based on said based on areas of match and said areas of mismatch between said resume or profile of said user and said selected possible subsequent position.

3. The one or more non-transitory computer readable storage mediums storing one or more sequences of instructions, which when executed by one or more processors of claim 1, further causes:

processing a first input from said user on a subset of said metadata that is of interest, wherein said subset of said metadata is at least one of a company metadata, a position metadata, and a frequency of transfers from at least one said subsequent position to a next position; and filtering said plurality of possible subsequent positions to obtain a subset of possible subsequent positions that match with said subset of said metadata that is of interest.

4. The one or more non-transitory computer readable storage mediums storing one or more sequences of instructions, which when executed by one or more processors of claim 3, further causes:

processing a second input from said user comprising an interaction with said selected possible subsequent position from said subset of possible subsequent positions; and generating and displaying a brief position profile of a position associated with said selected possible subsequent position in response to said interaction with said selected possible subsequent position, wherein said brief position profile comprises company information, title information, and salary information associated with said position.

5. The one or more non-transitory computer readable storage mediums storing one or more sequences of instructions, which when executed by one or more processors of claim 1, further causes:

filtering said possible subsequent positions that are associated with said plurality of possible subsequent positions based on said degree of match between said resume or profile details of said user and said position detail profiles of said possible subsequent positions.

6. The one or more non-transitory computer readable storage mediums storing one or more sequences of instructions, which when executed by one or more processors of claim 1, further causes:

processing at least one additional position; and identifying and displaying a comprehensive set of possible subsequent positions for said at least one additional position, wherein said comprehensive set of possible subsequent positions for said at least one additional position is identified based on subsequent positions held by said people who previously held at least one of a position that is equal to, or equivalent to said at least one additional position, wherein said plurality of possible subsequent positions that represent said comprehensive set of possible subsequent positions for said user is generated based on a combination of said comprehensive set of possible subsequent positions for said user based on said current position and said comprehensive set of possible subsequent positions for said at least one additional position.

7. The one or more non-transitory computer readable storage mediums storing one or more sequences of instructions, which when executed by one or more processors of claim 1, further causes:

processing background information for said user, wherein said background information is at least one of education information, at least one past position, skills information, or certification information; and identifying and displaying a comprehensive set of possible subsequent positions based on said background information by identifying subsequent positions held by said people having at least one of the same or equivalent education information, having held the same or equivalent position as said at least one past position, equal or equivalent skills information, or equal or equivalent certification information, wherein said plurality of possible subsequent positions that represent said comprehensive set of possible subsequent positions for said user is generated based on a combination of said comprehensive set of possible subsequent positions for said user based on said current position and said comprehensive set of possible subsequent positions based on said background information.

8. The one or more non-transitory computer readable storage mediums storing one or more sequences of instructions, which when executed by one or more processors of claim 1, further causes:

determining other metadata associated with said position-detail profiles, including any of (a) people who are currently in said selected possible subsequent position, (b) recruiters who source for the selected possible subsequent position, (c) hiring managers for the selected possible subsequent position, (d) salary range for the selected possible subsequent position, (e) growth or decline of such selected possible subsequent position in industry, (f) typical interview questions for such said selected possible subsequent position, or (g) employee feedback on culture for company and for the selected possible subsequent position, wherein said metadata is obtained from any of said comprehensive database of resumes or profiles, a job portal or a professional networking websites.

9. The one or more non-transitory computer readable storage mediums storing one or more sequences of instructions of claim 1, wherein said metadata associated with each of said possible subsequent positions for said user comprises user generated content that is entered by said people of said opportunity network system that comprises at least one of (a) work-life balance information, (b) interview questions, (c) a gender ratio or (d) what it takes to succeed in said possible subsequent positions.

10. The one or more non-transitory computer readable storage mediums storing one or more sequences of instructions of claim 1, wherein said metadata is determined by resumes or profiles of said people associated with said plurality of possible subsequent positions comprises at least one of (a) transition specific metadata selected from a frequency of transfers from at least one said subsequent position to a next position, (b) current opening metadata comprising current openings for said selected possible subsequent position, wherein the current openings is obtained from job postings, (c) position metadata comprising company size, an industry that said company belongs to, or salary information associated with said selected possible subsequent position, (d) people metadata selected from said people who hire for said subsequent positions, said people who held said subsequent positions in the past, said people who interviewed in the past for said subsequent positions, and said people from the same companies corresponding to said subsequent positions or (e) matching metadata that comprises a degree of match between at least one said subsequent position and said entity information of said user.

11. The one or more non-transitory computer readable storage mediums storing one or more sequences of instructions of claim 10, wherein said position metadata further comprises at least one of educational details, professional details, skills and certifications, years of experience prior to getting to said subsequent positions since graduation, years of experience in said subsequent positions, a position held prior to said subsequent positions or a position transitioned to after said subsequent positions of said people.

12. The one or more non-transitory computer readable storage mediums storing one or more sequences of instructions of claim 9, wherein said opportunity network system comprises a messaging system that allows said people to specify messaging preferences selected from who they are open to receiving messages from and on what topics, which when executed by the one or more processors, further causes:
processing a selection of said selected possible subsequent position from said plurality of possible subsequent positions;
obtaining said people metadata corresponding to said selected possible subsequent position;
extracting messaging preferences specified by said people from said people metadata corresponding to said selected possible subsequent position;
matching said user preferences with said messaging preferences; and
automatically generating a communication interface for said user to communicate with said people from said people metadata corresponding to said selected possible subsequent position.

13. The one or more non-transitory computer readable storage mediums storing one or more sequences of instructions, which when executed by one or more processors of claim 2, further causes:
analyzing metadata for a given category or sub-category for each of said possible subsequent positions for said user; and
dynamically generating filters for at least one of said category or said sub-category based on a frequency of occurrence of said category or sub-category of said metadata.

14. The one or more non-transitory computer readable storage mediums storing one or more sequences of instructions of claim 1, wherein said degree of match between said resume or profile and said normalized entity information of said user and at least one said position detail profile is computed by at least one of (a) verifying whether educational background of said people matches with people who are currently working in said selected possible subsequent position, (b) comparing years of experience of said people with said people who are currently in said selected possible subsequent position or (c) comparing salary of said people with said people who are currently in said selected possible subsequent position.

15. The one or more non-transitory computer readable storage mediums storing one or more sequences of instructions, which when executed by one or more processors of claim 1, further causes generating (a) a compatibility report comprising compatibility score for said user with said position detail profile, (b) a top skills of said user that matches with said position detail profile, and (c) a top skills that missing from a profile of said people.

16. An opportunity network system that provides career insights to a user by determining potential next positions and a degree of match to a potential next position, the system comprising:
a processor; and
a non-transitory computer readable storage medium comprising one or more modules executable by said processor, wherein said one or more modules comprises:
a web information extracting module that collects and pre-analyses a comprehensive database of resumes or profiles of people;
an intelligent profile parse module that extracts normalized entity information from resumes or profiles about backgrounds of people, including current and past positions held by people, wherein the intelligent profile parse module analyses said entity information of said people using at least one of machine learning techniques, statistical techniques, web-search techniques, or natural language processing techniques to obtain normalized entity information in resumes or profiles of said people;
an opportunity generation module that identifies and displays a comprehensive set of possible subsequent positions for said user based on said current position held by said user, wherein said comprehensive set of possible subsequent positions for said user is identified by (i) identifying said people who have held at least one of a position that is equal to, or equivalent to, said current position held by said user and (ii) determining subsequent positions held by said people who previously held said at least one of said position that is equal to, or equivalent to said current position of said user,
a position detail profile generation module that automatically generates a position-detail profile for a selected possible subsequent position that is selected from said possible subsequent positions, wherein said position-detail profile is generated based on at least one of (a) profiles of people who are currently in said selected possible subsequent position or (b) profiles people who have previously worked at said selected possible subsequent position wherein said position-detail profile comprises previous positions and subsequent positions of said people who are currently in said selected possible subsequent position or who may have previously worked at the position, wherein said selected possible subsequent position is selected by processing a selection of at least one of said possible subsequent positions based on said comprehensive set of possible subsequent positions; and a position compatibility module that determines a degree of match between resume or profile information of said user and at least one said position-detail profile of a selected possible subsequent position by comparing said resume or profiles information of said user with said position-detail profile.

17. The system of claim 16, wherein said position detail profile generation module further determines other metadata associated with said position-detail profiles, including any of people who are in said selected possible subsequent position, recruiters who source for the selected possible subsequent position, hiring managers for the selected possible subsequent position, salary range for the selected possible subsequent positions, growth or decline of such selected possible subsequent position in industry, typical interview questions for such said selected possible subsequent position, employee feedback on culture for company and for the selected possible subsequent position, wherein a message generation module that enables said user to communicate with one or more people associated with such said selected possible subsequent position to further explore career opportunities.

18. The system of claim 17, wherein said metadata is associated with each of said plurality of possible subsequent positions comprises at least one of (a) transition specific metadata selected from a frequency of transfers from at least one said subsequent position to a next position, (b) current opening metadata comprising current openings for said selected possible subsequent position, and (c) position metadata comprising company size, an industry that said company belongs to, or salary information associated with said selected possible subsequent position.

19. The system of claim 16, wherein said position detail profile generation module processes a selection of said selected possible subsequent position from said subset of possible subsequent positions; and generates a position detail profile in response to said selected possible subsequent position which comprises at least one of (a) said transition specific metadata, (b) said current opening metadata, (c) said position metadata, (d) said people metadata, or (e) said matching metadata.

20. A processor-implemented method that provides career insights to a user of an opportunity network system by determining potential next positions and a degree of match to a potential next position, said method comprising:
   collecting and pre-analyzing a comprehensive database of resumes or profiles of people;
   extracting normalized entity information from resumes or profiles about backgrounds of people, including current and past positions held by people;
   analyzing of said entity information of said people using at least one of machine learning techniques, statistical techniques, web-search techniques, or natural language processing techniques to obtain normalized entity information from resumes or profiles of said people;
   identifying and displaying a comprehensive set of possible subsequent positions for said user based on said current position held by said user, wherein said comprehensive set of possible subsequent positions for said user is identified by (i) identifying said people who have held at least one of a position that is equal to, or equivalent to, said current position held by said user and (ii) determining subsequent positions held by said people who previously held said at least one of said position that is equal to, or equivalent to said current position of said user;
   processing a selection of at least one of said possible subsequent positions based on said comprehensive set of possible subsequent positions to obtain a selected possible subsequent position;
   automatically generating a position-detail profile for said selected possible subsequent position that is selected from said possible subsequent positions, wherein said position-detail profile is generated based on at least one of (a) profiles of people who are currently in said selected possible subsequent position or (b) profiles of people who have previously worked at said selected possible subsequent position, wherein said position-detail profile comprises previous positions and subsequent positions of said people who are currently in said selected possible subsequent position or who may have previously worked at the position; and
   determining a degree of match between said resume or profiles information of said user and at least one said position-detail profile of said selected possible subsequent position by comparing said resume or profiles information of said user with said position-detail profile.

* * * * *